United States Patent
Leigh et al.

(10) Patent No.: US 10,725,245 B2
(45) Date of Patent: Jul. 28, 2020

(54) HIGH-DENSITY FABRIC SYSTEMS INTERCONNECTED WITH MULTI-PORT AGGREGATED CABLES

(71) Applicant: HEWLETT PACKARD ENTERPRISE DEVELOPMENT LP, Houston, TX (US)

(72) Inventors: Kevin B. Leigh, Houston, TX (US); Nicolas G. McDonald, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/221,537

(22) Filed: Dec. 16, 2018

(65) Prior Publication Data
US 2020/0192035 A1 Jun. 18, 2020

(51) Int. Cl.
*G02B 6/38* (2006.01)
*G02B 6/44* (2006.01)

(52) U.S. Cl.
CPC .......... *G02B 6/381* (2013.01); *G02B 6/3897* (2013.01); *G02B 6/4415* (2013.01)

(58) Field of Classification Search
CPC .... G02B 6/381; G02B 6/3897; G02B 6/4401; G02B 6/4415
USPC .................. 385/59, 60, 71, 72, 78, 100, 114
See application file for complete search history.

(56) References Cited

U.S. PATENT DOCUMENTS

| | | | |
|---|---|---|---|
| 5,394,503 A * | 2/1995 | Dietz, Jr. | G02B 6/3817 385/134 |
| 5,436,987 A | 7/1995 | Saito et al. | |
| 5,859,717 A * | 1/1999 | Scobey | G02B 6/29395 398/79 |
| 7,738,757 B1 | 6/2010 | Pakravan et al. | |
| 7,740,409 B2 | 6/2010 | Bolton et al. | |
| 7,979,985 B2 | 7/2011 | Spitaels et al. | |
| 9,039,432 B2 | 5/2015 | Wethington et al. | |
| 9,482,840 B2 | 11/2016 | Conner et al. | |
| 9,507,113 B2 | 11/2016 | Lawson et al. | |
| 9,609,782 B2 | 3/2017 | Faw et al. | |
| 9,614,619 B1 * | 4/2017 | Shen | H04B 10/40 |
| 9,641,254 B1 * | 5/2017 | Shen | H04B 10/40 |
| 10,382,845 B2 * | 8/2019 | Raza | H04B 10/40 |
| 2002/0039468 A1 * | 4/2002 | Lin | G02B 6/43 385/17 |

(Continued)

OTHER PUBLICATIONS

IBM, "Fibre Channel Planning and Integration: User's Guide and Service Information," Fourth Edition, May 2002, pp. 1-172.

*Primary Examiner* — Robert Tavlykaev
(74) *Attorney, Agent, or Firm* — Sheppard Mullin Richter & Hampton LLP

(57) ABSTRACT

A multi-port aggregated cable includes: a plurality of duplex optical fibers, each duplex optical fiber having a first end and a second end; a first optical interface attached to each of the duplex optical fibers at the first end thereof and defining multiple ports, one for each of the duplex optical fibers, the first optical interface aggregating the duplex optical fibers at the first end thereof; and a second optical interface attached to each of the duplex optical fibers at the second end thereof and defining multiple ports, one for each of the duplex optical fibers, the second optical interface aggregating the duplex optical fibers at the second end thereof.

18 Claims, 24 Drawing Sheets

(56) References Cited

U.S. PATENT DOCUMENTS

| | | | |
|---|---|---|---|
| 2003/0039014 A1* | 2/2003 | English | H04B 10/801 |
| | | | 398/164 |
| 2009/0103923 A1* | 4/2009 | Hosomi | G02B 6/4215 |
| | | | 398/91 |
| 2013/0294730 A1* | 11/2013 | Leigh | H01R 13/6271 |
| | | | 385/53 |
| 2014/0002988 A1* | 1/2014 | Roesner | G06F 1/20 |
| | | | 361/679.49 |
| 2014/0205244 A1* | 7/2014 | Bradley | G02B 6/3869 |
| | | | 385/78 |
| 2014/0248057 A1* | 9/2014 | Li | G02B 6/4446 |
| | | | 398/82 |
| 2014/0301701 A1* | 10/2014 | Leigh | G02B 6/3879 |
| | | | 385/71 |
| 2014/0334774 A1* | 11/2014 | Tan | H01L 25/50 |
| | | | 385/14 |
| 2015/0063771 A1* | 3/2015 | Mogul | G02B 6/4452 |
| | | | 385/135 |
| 2015/0098173 A1* | 4/2015 | Leigh | H05K 7/1487 |
| | | | 361/679.5 |
| 2016/0041065 A1* | 2/2016 | L'Heureux | G01M 11/3136 |
| | | | 356/73.1 |
| 2016/0131854 A1* | 5/2016 | de Jong | G02B 6/3879 |
| | | | 385/59 |
| 2016/0192044 A1* | 6/2016 | Raza | G02B 6/3885 |
| | | | 398/49 |
| 2018/0335576 A1* | 11/2018 | Farbert | G02B 6/43 |

\* cited by examiner

HIGH-DENSITY FABRIC SYSTEMS INTERCONNECTED WITH MULTI-PORT AGGREGATED CABLES

STATEMENT OF GOVERNMENT INTEREST

This invention was made with Government support under Prime Contract No. DE-AC52-07NA27344 awarded by DOE. The Government has certain rights in the invention.

BACKGROUND

Many large-scale computing systems include a "fabric" in which a set of computing resources, such as processing, memory, and storage, are interlinked through multiple connections and operate cohesively with one another. Traditional fabrics are built by interconnecting multiple switch systems using multiple individual-port cables. Most switch systems have one multi-port switch chip and multiple pluggable electrical module cages (for electrical cables or optical transceivers) for the ports that dominate the faceplate area that in turn drives the switch system form factors, e.g., 1U, 2U, etc. Larger switch systems based on "chassis" have multiple switch chip cards interconnecting to I/O cards with pluggable module cages, and again single-port optical transceivers take up significant amount of volume. Optically integrated switches enable high-density switch chips and the corresponding passive optical connectors enable less faceplate area within a system. Liquid cooling of switch chips further improves switch chip density within a system.

BRIEF DESCRIPTION OF THE DRAWINGS

Examples described herein may be understood by reference to the following description taken in conjunction with the accompanying drawings, in which like reference numerals identify like elements.

Figure 1:
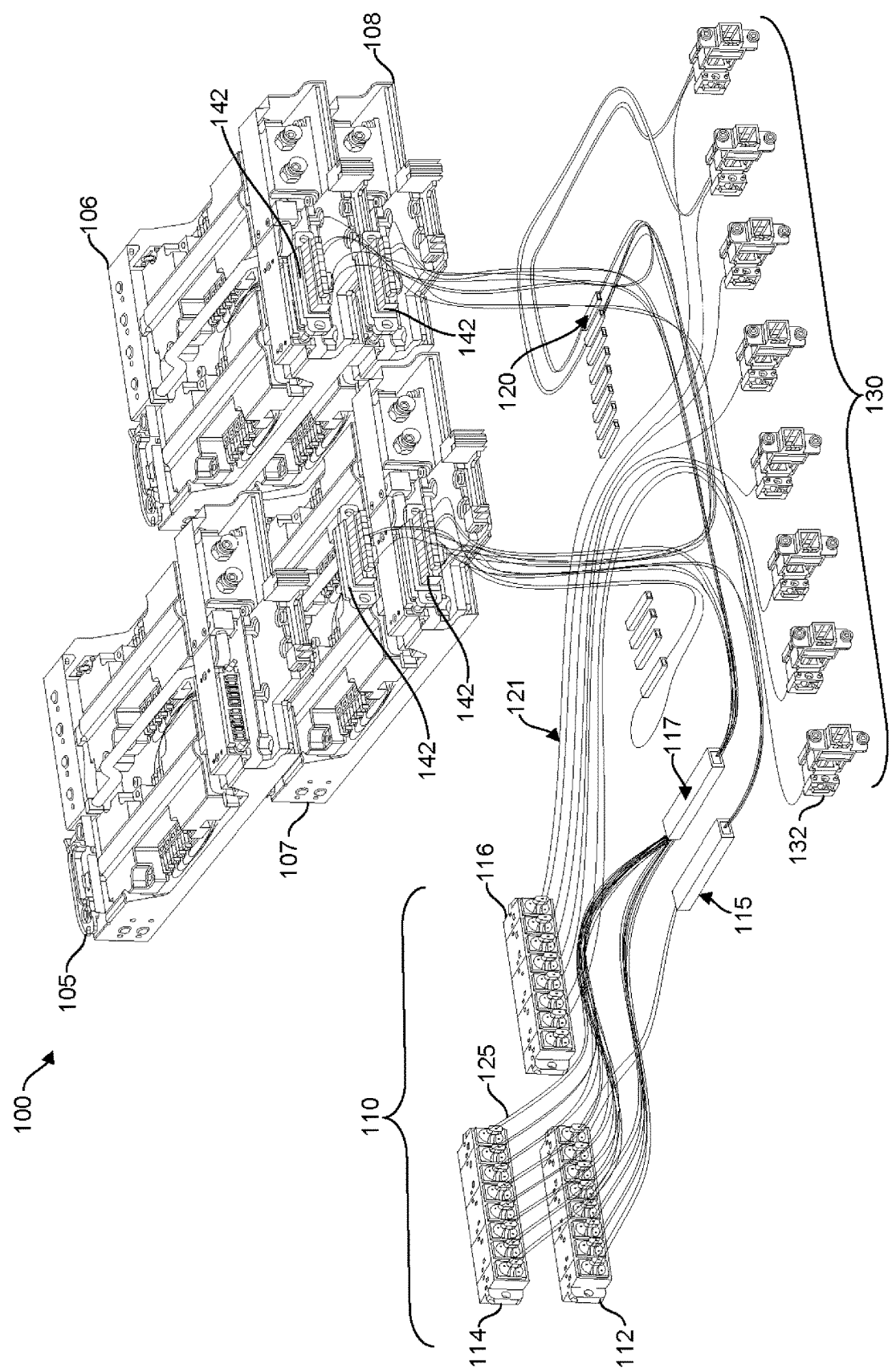
FIG. 1 depicts selected portions of an assembly in accordance with one or more examples.

While examples described herein are susceptible to various modifications and alternative forms, the drawings illustrate specific examples herein described in detail by way of example. It should be understood, however, that the description herein of specific examples is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative examples of the subject matter claimed below will now be disclosed. In the interest of clarity, not all features of an actual implementation are described in this specification. It will be appreciated that in the development of any such actual example, numerous implementation-specific decisions will be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

This disclosure provides an optical cabling technique to interconnect co-packaged switch chips with Course Wavelength Division Multiplexing ("CWDM") optics (multiple wavelengths per fiber) for both air-cooled and liquid-cooled fabric computing systems. Multiple switch ports are aggregated (and disaggregated) in internal and external fiber assemblies called MPACs (multi-port aggregated cables). Multiple stages of internal and external MPACs may be connected in sequence among multiple switch systems to create a fabric topology.

In accordance with the present disclosure, multiple systems may be interconnected with external MPACs. Each switch system has internal MPACs and blind-mate connectors to facilitate serviceable switch chips and bridge chips. Internal MPACs may be optical fiber shuffles to connect among different optical connectors or fiber jumpers to connect to switch chips.

A MPAC is an optical fiber assembly comprising a plurality of multiple, aggregated duplex optical fibers. In some examples, single optical fibers may be paired where a first one of the paired optical fibers is a transmit fiber supporting multiple transmission wavelengths and a second one of the paired optical fibers is a receive fiber supporting multiple receive wavelengths. In other examples, each of the aggregated duplex optical fibers is a single optical fiber that supports multiple transmit wavelengths and multiple receive wavelengths. For present purposes, both implementations will be referred to as an aggregated duplex optical fiber. Each MPAC also includes an optical interface on either end.

Depending on the implementation, the optical interface may include: a single optical connector providing multiple optical connections; a plurality of optical connectors, each providing a single respective optical connection; or some combination. The aggregation of the duplex optical fibers occurs at the optical interfaces on either end of the MPAC. The optical interfaces are connectors that support multiple ports, one port for each duplex optical fiber. In some examples, aggregation of the optical fibers may be further achieved by sheathing or encasing the duplex optical fibers. However, this is not required. It therefore suffices that the duplex optical fibers are aggregated at their ends by the optical interfaces. Multi-port optical connectors aggregating duplex optical fibers may be referred to as "MPAC connectors".

A MPAC may be an "external" cable or an "internal" cable. In this context, "external" and "internal" are defined relative to a chassis or an enclosure. Thus, "external" is external relative to a chassis or enclosure and "internal" is internal relative to a chassis or enclosure. In general, internal MPACs may use bare fibers because they are protected within a system and external MPACs may use jacketed fibers to help prevent fiber damage due to handling. An external MPAC may be an external optical cable; an external optical fiber shuffle (a fiber shuffle is a "many to many" optical connectors connected fiber assembly); or an external optical jumper (a jumper is a one to many optical connectors connected fiber assembly). An internal MPAC may be an internal optical fiber shuffle or an internal optical jumper. These examples are not exhaustive and their listing is not limiting.

Turning now to FIG. 1, selected portions of an assembly 100 are shown. Some portions are omitted for the sake of clarity and so as not to obscure that which is claimed below. The assembly 100 may be a switch chassis which may be inside a computing system enclosure (not shown). The computing system enclosure may also include compute node chassis (not shown) that interface to the assembly 100. The assembly 100 may include four switch line-cards 105-108, line-card interface optical connectors 142, a faceplate optical interface 110 and a midplane optical interface 130.

Each line-card interface optical connector 142 allows a line-card to be modularly installed in the assembly 100. The faceplate optical interface 110 includes a plurality of faceplate optical connectors 112, 114, 116. There may be additional faceplate optical connectors that are not shown. The faceplate optical interface 110 generally, and the faceplate optical connectors 112, 114, 116 specifically, define an externally facing optical interface by which the assembly 100 may be optically connected to other assemblies. The faceplate optical connectors 112, 114, 116 are panel-mount optical connectors to accept external MPAC cables, such as standard multi-fiber push-on ("MPO") adapters, although other types of optical connectors may be used in other examples. Note that the faceplate is not shown.

The midplane optical interface 130 includes a plurality of midplane optical connectors 132, only one of which is indicated. The midplane optical interface generally, and the midplane optical connectors 132 specifically, define an internally facing optical interface by which the assembly 100 may be optically connected to other assemblies such as compute nodes within the same enclosure. The midplane interface optical connectors 132 are panel-mount blind-mate optical connectors, although other types of optical connectors may be used in other examples. Note that the switch system bulkhead to mount the midplane interface optical connectors is not shown.

The assembly 100 also includes internal MPAC shuffles 115, 117 and 120. The assembly 100 further includes internal MPAC jumpers 121. Each of the internal MPAC shuffles 115, 117, 120 and internal MPAC jumpers 121 includes a plurality of aggregated duplex optical fibers 125, only one of which is indicated. Each optical fiber 125 may be a pair where a first one of the paired optical fibers is a transmit fiber supporting multiple transmission wavelengths and a second one of the paired optical fibers is a receive fiber supporting multiple receive wavelengths. In other examples, each of the aggregated duplex optical fibers is an optical fiber that supports multiple transmit wavelengths and multiple receive wavelengths.

Each of the internal MPAC shuffles 115, 117, 120 and internal MPAC jumpers 121 also includes an optical connector on either end of each of the aggregated duplex optical fibers 125. In some examples, at least some of the aggregated duplex optical fibers 125 and one or more of the optical connectors will define multiple connections, or ports, one for each of the aggregated duplex optical fibers 125. The type of optical connector will be implementation specific and will depend on the optical connector to which it will be mated in a manner that will be apparent to those skilled in the art having the benefit of this disclosure. The internal MPAC shuffles 115, 117 provide connections between a set of faceplate optical connectors 112, 114 to all the switch line-card optical connectors 142. The internal MPAC shuffles 120 provide connections between a set of midplane interface optical connectors 132 to all the switch line-card blind-mate optical connectors 142. Each of the switch line-card optical connectors 142 is a blind-mate optical connector. The internal MPAC jumpers 121 provide connections between a set of midplane interface optical connectors 130 to a set of faceplate optical connectors 116.

MPACs may be used to implement a fabric computing system. A fabric computing system may include a plurality of components with optical interfaces such as multiple switch chips (for instance, within switch modules) or multiple bridge chips (such as within compute modules), or some combination of those. In some examples, a switch or bridge chip may be co-packaged with components including optical interfaces having at least a chip ferrule supporting multiple aggregated duplex optical fibers. "Co-package" in this context means opto-electronics of an optical transceiver and optical connection interfaces are within the same package as an application specific integrated circuit ("ASIC") that may be disposed on a system board. In other examples, a switch or a bridge chip may be co-located with components having optical interfaces having at least a chip ferrule supporting multiple aggregated duplex optical fibers. "Co-located" in this context means at least one optical transceiver package and an ASIC package are disposed on the same system board, where each optical transceiver may comprise opto-electronics and optical connection interfaces. An optical connection interface may be an optical socket to accept a chip ferrule. A chip ferrule may modularly and opto-mechanically couple to an optical connection interface of a co-packaged or co-located optical transceiver. A chip ferrule may support multiple aggregated duplex optical fibers where each duplex optical fiber may be a fiber pair, comprising a transmit (Tx) fiber and a receive (Rx) fiber, each fiber supporting multiple Tx or Rx wavelengths, or a fiber supporting multiple Tx and Rx wavelengths. A switch chassis may house at least a switch line-card that may be modularly installed to the switch chassis. Accordingly, the switch chassis may include multiple faceplate optical connectors that allow external MPACs to be connected in order for external systems, such as other switch chassis, to connect to the switch line-cards within the switch chassis. A switch chassis may also include multiple internal blind-mate optical connectors allowing internal MPACs to be connected among the line-cards via the line-card blind-mate optical connectors and compute node chassis within the same computing enclosure via the midplane interface blind-mate optical connectors.

Figure 2:
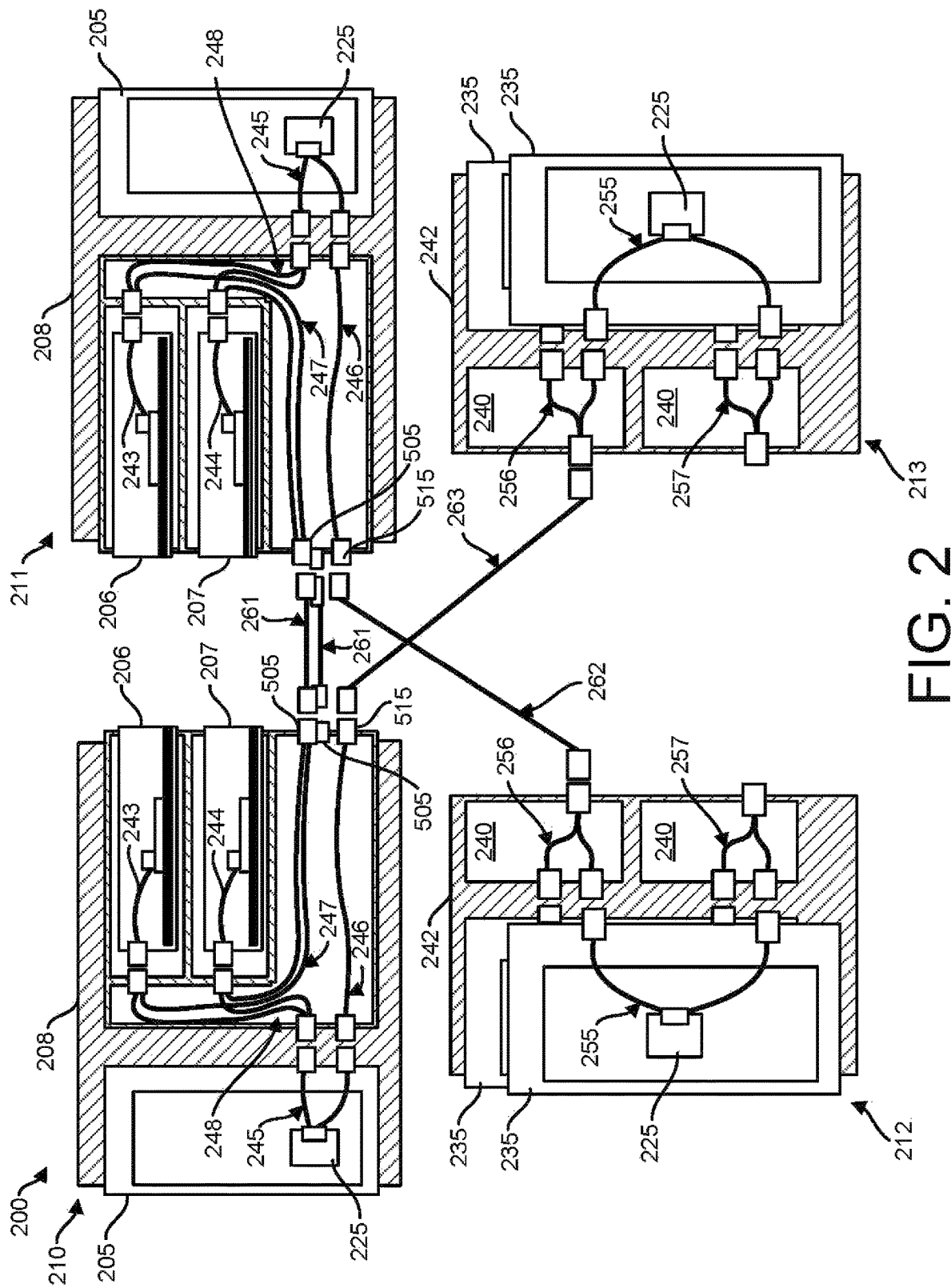
FIG. 2 conceptually depicts one example of a fabric computing system in accordance with the disclosure herein.

Consider FIG. 2, which conceptually depicts one example of a fabric computing system 200 in accordance with the disclosure herein. The fabric computing system 200 includes four computing systems 210-213, each illustrated in a side view. Each of the computing systems 210, 211 houses a blade 205 and two switch line-cards 206, 207 within a blade enclosure 208. The switch line-cards 206, 207 are serviceable switch modules in this particular embodiment. Each computing system 212, 213 houses multiple blades 235 as well as multiple interconnect modules 240 within an enclosure 242. Each of the blades 205, 235 contains a bridge chip 225 to translate between electrical signals carrying computing interface protocols and optical signals carrying a fabric protocol. Electrical signals within a blade 205, 235 interface to multiple computing chips such as processors (not shown). Optical signals are transported on internal MPACs 245, 255.

Each computing system 210, 211 includes five internal MPACs 243-248 and each of the computing systems 212, 213 includes three internal MPACs 255-257. Each of the internal MPACs 243-248 and 255-257 include multiple aggregated duplex optical fibers that are aggregated at optical multi-port optical connectors on either end. The single optical fibers may be paired where a first one of the paired optical fibers is a transmit fiber supporting multiple transmission wavelengths and a second one of the paired optical fibers is a receive fiber supporting multiple receive wavelengths. In other examples, each of the aggregated duplex optical fibers is an optical fiber that supports multiple transmit wavelengths and multiple receive wavelengths.

Figure 3:
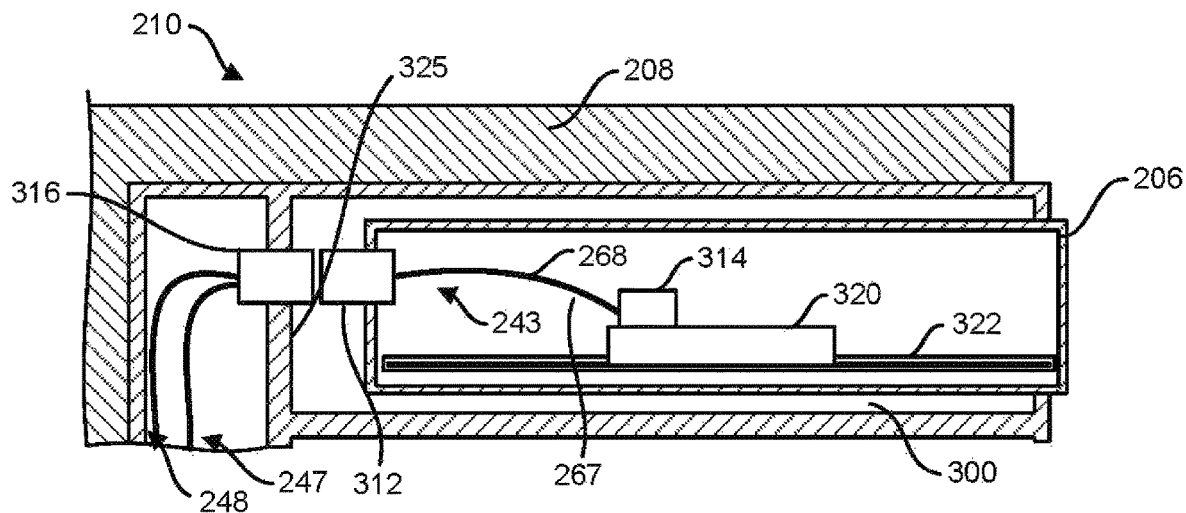
FIG. 3 depicts a switch line-card first shown In FIG. 2 in a side view.

Turning now to FIG. 3, the switch line-card 206 first shown in FIG. 2 is shown in an enlarged view. The following discussion regarding the switch line-card 206 also applies equally to the switch line-card 207. The switch line-card 206 is installed in a bay 300 of the computing system 210 defined within the blade enclosure 208. One end of the internal MPAC 243 includes an optical connector 312 and the other end includes a chip ferrule 314. Thus, in this example, the optical connector 312 constitutes a first optical interface and the chip ferrule 314 constitutes a second optical interface, both of which support multiple ports, one for each aggregated duplex optical fiber (not separately shown). The switch line-card 206 includes a switch chip 320 to which the chip ferrule 314 is connected and is, in turn, mounted to a base board 322. A chip ferrule 314 may modularly connect to a switch chip 320 via an optical socket (not shown). A chip ferrule 314 aggregates multiple ports and a switch chip 320 may have multiple chip ferrules 314. For example, if a chip ferrule 314 aggregates eight ports then a 64-port switch chip 320 will have eight chip ferrules 314.

The optical connector 312 includes multiple ferrules (not separately shown) that blind-mate with corresponding ferrules (not separately shown) of the optical connector 316 installed in the bulkhead 325 of the structure defining the bay 300. Note that the optical connector 316 supports MPACs 247, 248, each having aggregated duplex optical fibers. The MPAC 243 may include two aggregated duplex optical fibers 267, 268. Each of the aggregated duplex optical fibers 267, 268 terminates on one end with a chip ferrule 314 by which the aggregated duplex optical fibers 267, 268 are mated to the switch chip 320. The other end of the aggregated duplex optical fibers 267, 268 terminate in the optical connectors 312. Through this optical connection of optical connectors 312 and 316, the switch line-card 206 is optically connected to both the internal MPACs 247 and 248 via MPAC 243 as shown in FIG. 3. Thus, the internal MPAC 243 is an optical jumper establishing a "one to many" connection.

Figure 4:
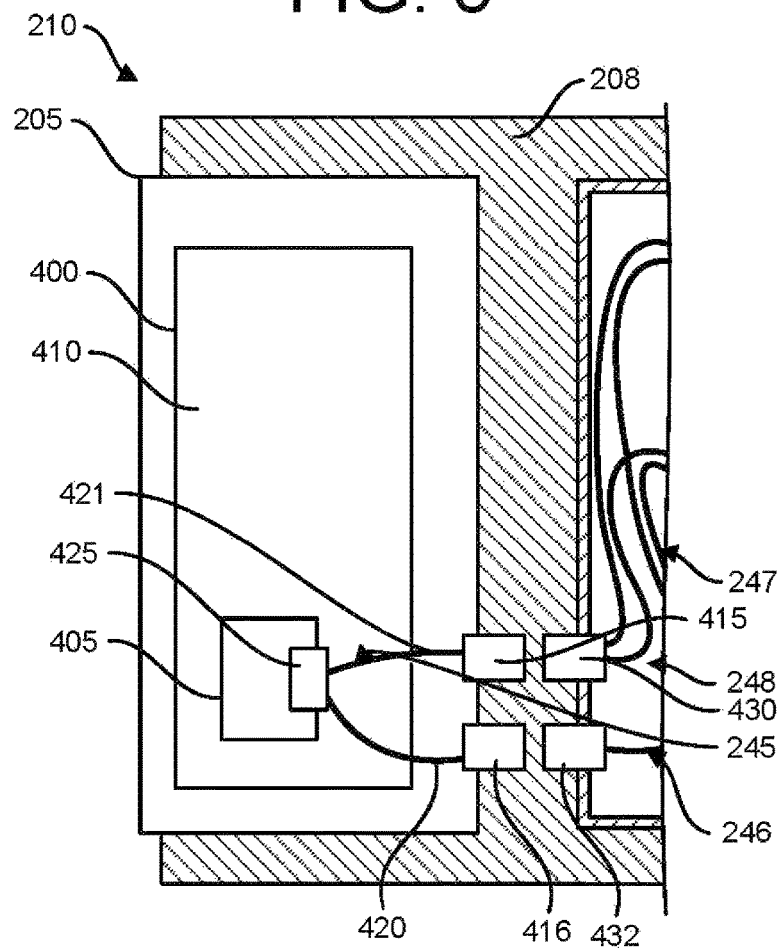
FIG. 4 depicts a blade first shown in FIG. 2 in a side view.

FIG. 4 depicts the blade 205 first shown in FIG. 2 in an enlarged view. The blade 205 includes a compute node 400 further including a bridge chip 405 mounted to a base board 410. The blade 205 is installed in a bay (not otherwise shown) of the computing system 210 defined within the blade enclosure 208. The bridge chip 405 is connected to two optical connectors 415, 416 by the internal MPAC 245.

The internal MPAC 245 includes two aggregated duplex optical fibers 420, 421. Each of the aggregated duplex optical fibers 420, 421 terminates on one end with a chip ferrule 314 by which the aggregated duplex optical fibers 420, 421 are mated to the bridge chip 405. The other end of the aggregated duplex optical fibers 420, 421 terminate in the optical connectors 415, 416. The optical connectors 415, 416 of the blade 205 blind-mate with the optical connectors 430, 432 that terminate one end of the internal MPACs 245, 246, respectively, as the blade 205 is inserted into the bay mentioned above. The internal MPAC 245 is a "one to many" connection and therefore is an optical jumper.

Figure 5:
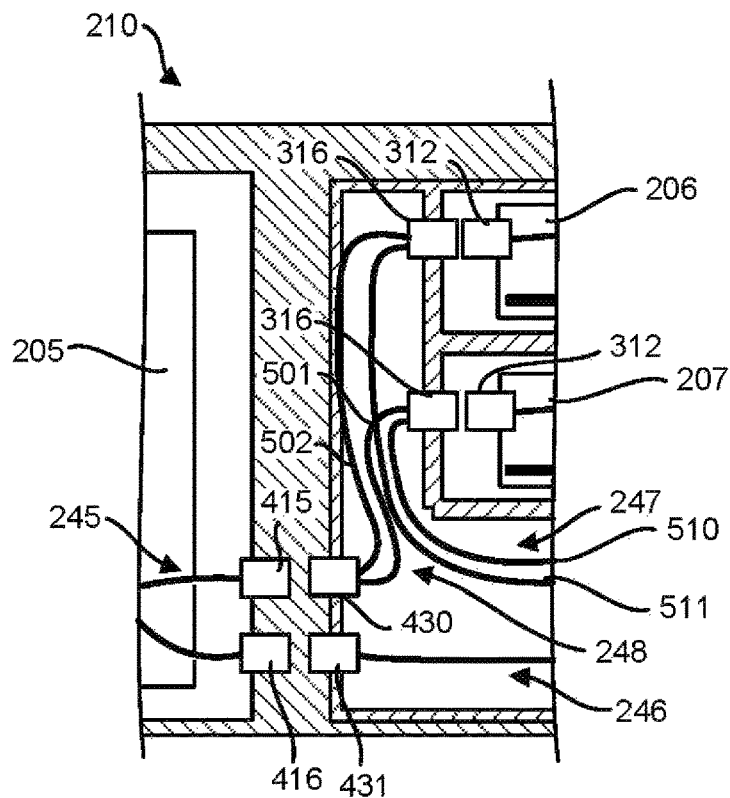
FIG. 5 illustrates selected internal connections of a computing system first shown in FIG. 2 in an enlarged, side view.

FIG. 5 illustrates selected internal connections of a computing system 210 first shown in FIG. 2 in an enlarged, side view. In particular, note the optical connections between the blade 205 and the switch line-cards 206, 207 via the internal MPAC 248. The internal MPAC 248 includes two aggregated duplex optical fibers 500, 501 and the internal MPAC 248 provides a "one to many" connection. The internal MPAC 248 is therefore an optical jumper.

Note also that the switch line-cards 206, 207 are also optically connected to multiple faceplate optical connectors 505, shown in FIG. 2 via the internal MPAC 247. Each faceplate optical connector 505 is a portion of the internal MPAC 247 and provides an external optical connection for the switch line-cards 206, 207. The internal MPAC 247 includes two aggregated duplex optical fibers 510, 511. The internal MPAC 247 provides a "many to many" connection and is therefore an optical fiber shuffle.

Finally, the internal MPAC 246 terminates at one end in an optical connector 431 and at the other in a faceplate optical connector 515 shown in FIG. 2. The optical connector 431 mates with the optical connector 416 of the internal MPAC 245 on the blade 205. The internal MPAC 246 therefore provides the blade 205 with an external connection through a "one to one" connection.

Figure 6:
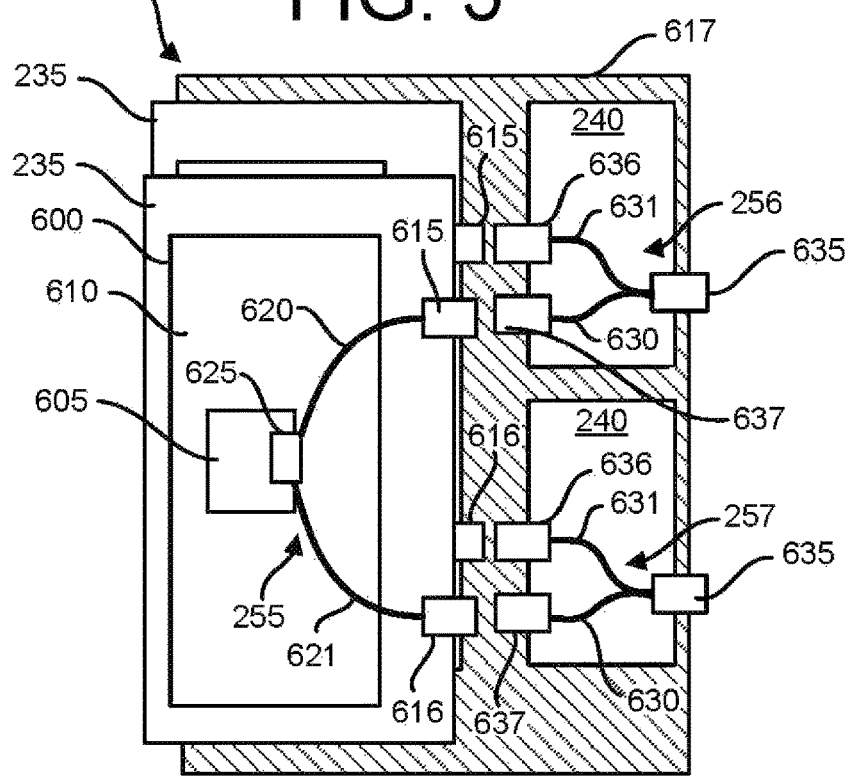
FIG. 6 is an enlarged view of a computing system first shown in FIG. 2.

FIG. 6 is an enlarged view of the computing system 212 first shown in FIG. 2. Note that the computing system 212 is the same in structure as the computing system 213. The following discussion regarding computing system 212 is therefore also applicable to computing system 213. The computing system 212 includes multiple blades 235 and multiple interconnect modules 240 as described above.

The blade 235 includes a compute module 600 further including a bridge chip 605 mounted to a base board 610. The blade 235 is installed in a bay (not otherwise shown) of the computing system 212 defined within the blade enclosure 617. The bridge chip 605 is connected to two optical connectors 615, 616 by the internal MPAC 255. The internal MPAC 255 includes two aggregated duplex optical fibers 620, 621. Each of the aggregated duplex optical fibers 620, 621 terminates on one end with a chip ferrule 625 by which the aggregated duplex optical fibers 620, 621 are connected to the bridge chip 605. The other end of the aggregated duplex optical fibers 620, 621 terminate in the optical connectors 615, 616. Note that the internal MPAC 255 provides a "one to many" connection and so is an optical jumper.

The interconnect modules 240 each include a respective internal MPAC 256, 257. Each of the internal MPACs 256, 257 includes two aggregated duplex optical fibers 630, 631, terminating on one end in an optical connector 635 and on the other end in two optical connectors 636, 637. The optical connectors 635 of each interconnect module 240 provide an external connection for the blades 235. The optical connectors 635 are faceplate connectors and they provide an externally facing optical interface by which the external connection can be made by using external MPACs. The optical connectors 637 of the first interconnect module 240 blind-mate with the optical connectors 615 of a first blade 235 while the optical connectors 636 of the first interconnect module 240 blind-mate with the optical connectors 615 of a second blade 235. The optical connectors 637 of the second interconnect module 240 blind-mate with the optical connectors 616 of a first blade 235 while the optical connectors 636 of the second interconnect module 240 blind-mate with the optical connectors 616 of the second blade 235. The internal MPACs 256, 257 provide "one to many" connections and therefore are optical jumpers.

Returning to FIG. 2, optical connections may be made between and among the computing systems 210-213 using, for instance, the external MPACs 261-263. Each of the external MPACS 261-263 includes multiple aggregated duplex optical fibers (not individually shown) as described above. Each external MPAC 261 provides an external optical connection between the corresponding ports of the switch line-cards 206, 207 of the computing system 210 with the switch line-cards 206, 207 of the computing system 211 via the internal MPACs 247. The external MPAC 262 provides an external optical connection between the blades 235 of the computing system 212 and blade 205 of the computing system 211 via the internal MPACs 255, 256, and 246. Similarly, the external MPAC 263 provides an external optical connection between the blades 235 of the computing system 213 and the blade 205 of the computing system 210 via the internal MPACs 255, 256, and 246.

It will be apparent to those skilled in the art that the subject matter claimed below encompasses many variations departing from the implementation specific details of the fabric computing system 200. For instance, the switch line-cards 206, 207 may be installed in a stand-alone switch chassis rather than a blade enclosure. Similarly, blade enclosures may house or omit switches such as those provided by the switch line-cards 206, 207. Additionally, switch line-cards may be connected to external compute nodes, input/output ("I/O") nodes, memory nodes, accelerator nodes, etc., using external MPACs. Accordingly, the discussion of the fabric computing system 200 above is illustrative only and is not to be considered limiting.

Figure 33:
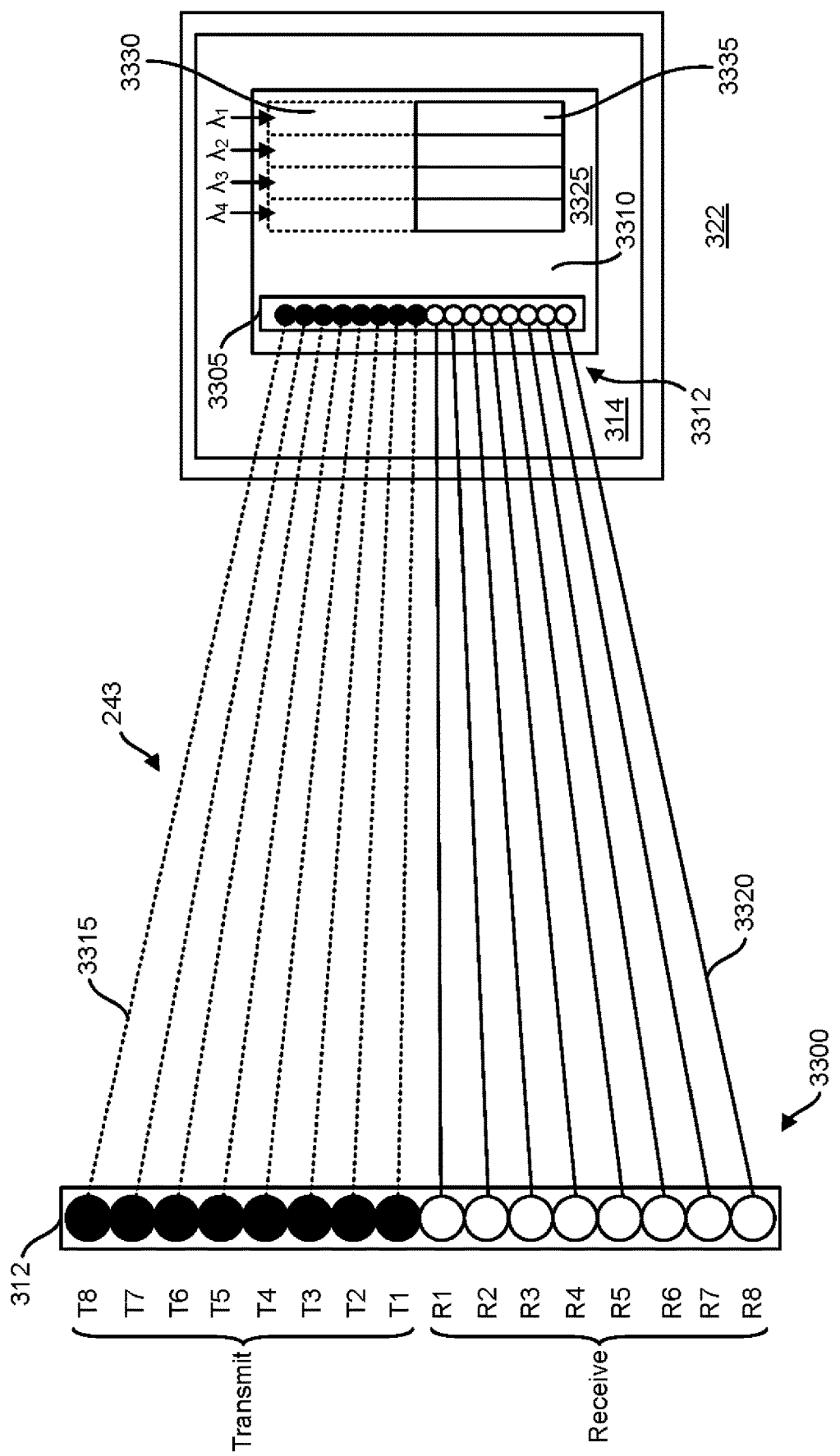
FIGS. 33-35 illustrate optical connections first discussed relative to the computing system first shown in FIG. 2 and subsequently discussed relative to FIG. 3 to FIG. 6.

FIG. 33 conceptually depicts a top view of the optical connections of the internal MPAC 243, first shown in FIG. 2 and discussed relative to FIG. 3. The internal MPAC 243 is an optical jumper since it provides one connector 312 at a first end 3300 and a parallel-fiber termination point 3305 at a second end 3312. There are eight transmit optical fibers 3315 (only one indicated) and eight receive optical fibers 3320 for a total of 16 optical fibers in the parallel-fibers of the internal MPAC 243. In this example, each transmit optical fiber 3315 is paired with a respective receive optical fiber 3320. Each transmit optical fiber 3315 and each receive optical fiber 3320 supports four wavelengths $\lambda_1$-$\lambda_4$ of signals. Thus, each transmit optical fiber 3315 and each receive optical fiber 3320 supports four channels. A port may consist of a four transmit channels and four receive channels. There are therefore 32 transmit channels and 32 receive channels, representing eight ports, in this example.

Figure 36:
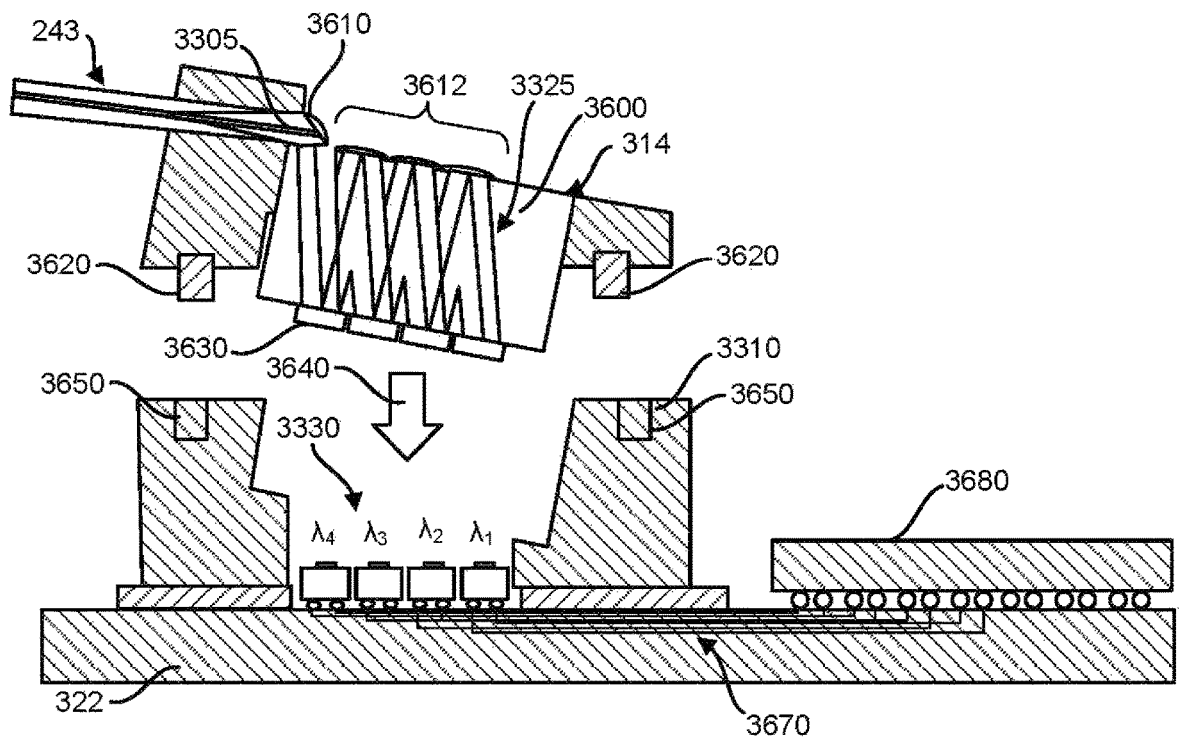
FIG. 36 and FIG. 37 illustrate an optical connection between a chip ferrule of an internal MPAC and a chip socket of a base board as may be used in one or more examples.
Figure 37:
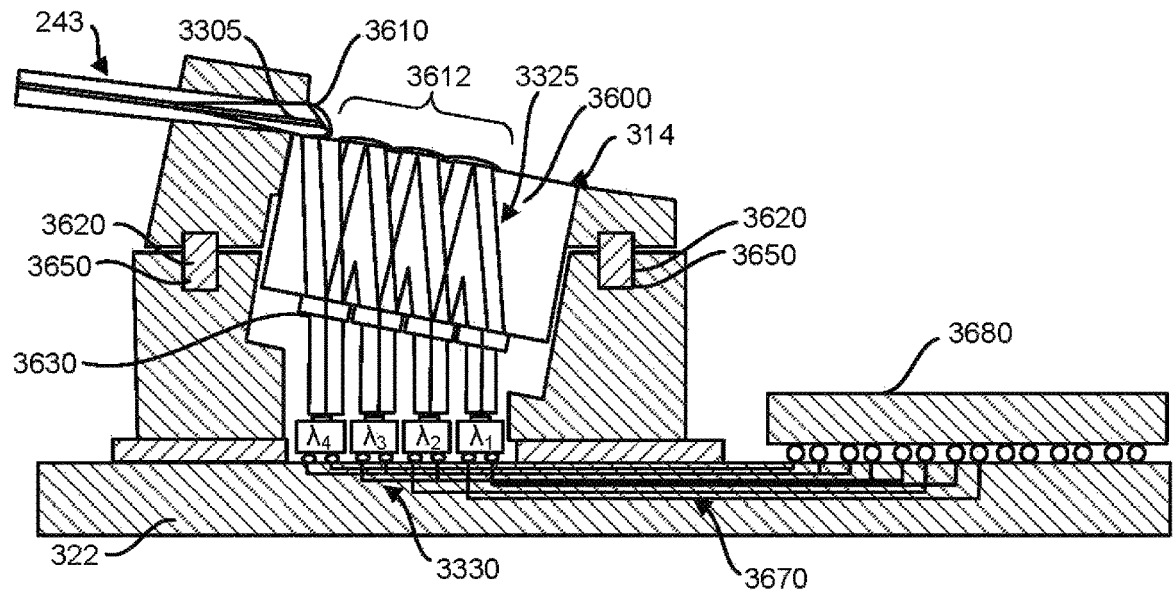

FIG. 36 and FIG. 37 illustrate the optical connection between the chip ferrule 314 and the chip socket 3310, as well as subsidiary structures, in greater detail. The chip ferrule 314, when assembled as indicated by the arrow 3640, mates with the chip socket 3310 as shown in FIG. 37. The mating is facilitated by alignment features 3620 in the chip ferrule that mate with opposing alignment features 3650.

The internal MPAC 243 is, in this particular example, a 16-fiber ribbon whose structure is as described in FIG. 33. The internal MPAC 243 terminates in the chip ferrule 314 at the parallel-fiber termination point 3305 whereupon the optical signals are coupled between the MPAC 243 and the chip ferrule 314. The chip ferrule 314 includes a micro-optic assembly 3325 which in turn includes an optical zig-zag block 3600. The optical zig-zag block 3600 is constructed of a light-turn focusing lens array 3610, plurality of mirror arrays 3612 and a two-dimensional wavelength filter array 3630. The optical zig-zag block 3600 multiplexes transmit wavelengths and demultiplexes receive wavelengths in transmit and receive signals, respectively.

The chip socket 3310 encompasses plurality of lens-integrated laser arrays 3330. The individual laser arrays 3330 emit optical signals at a respective wavelength $\lambda_1$-$\lambda_4$ and are bottom-emitting vertical-cavity surface-emitting lasers ("VCSELs"). The laser arrays 3330 are flip-chipped on the base board 322. The laser arrays 3330 are driven by an integrated circuit 3680 over a first set of plurality of traces 3670 within the base board 322. The chip socket 3310 also encompasses plurality of lens-integrated photodetector arrays 3335 (as shown in FIG. 33 but not visible in FIG. 36 and FIG. 37). The individual photodetector arrays 3335 receive optical signals at a respective wavelength $\lambda_1$-$\lambda_4$. The photodetector 3335 are flip-chipped on the base board 322. The photodetector arrays 3335 send electrical signals to an integrated circuit 3680 over a second set of plurality of traces 3670 within the base board 322. The integrated circuit 3680 includes laser drivers to send electrical signals to the laser arrays 3330 and trans-impedance amplifiers to receive electrical signals from the photodetector arrays 3335. In some examples, the integrated circuit 3680 may be a part of a larger integrated circuit such as a switch chip 320 as shown in FIG. 3 or a bridge chip 405 as shown in FIG. 4. In some other examples the integrated circuit 3680 may be a stand-alone optical transceiver chip that includes other logic functions and system interface electrical signals.

Referring now to FIG. 33, FIG. 36 and FIG. 37 collectively, chip ferrule 314 is an origination point as well as a destination point for a set of ports to and from an internal MPAC. A chip ferrule 314 is modularly installed into a chip socket 3310 of a base board 322. There are electro-optical components disposed within the chip socket 3310. The electro-optical components include plurality of lens-integrated laser arrays 3330 (only one indicated), each array transmitting at a respective wavelength $\lambda_1$-$\lambda_4$ representing a transmit port. The plurality of laser arrays 3330 form a two-dimensional ("2D") laser arrays. The electro-optical components also include a plurality of lens-integrated photodetector arrays 3335 (only one indicated), each array receiving a respective wavelength $\lambda_1$-$\lambda_4$ representing a receive port. The plurality of photodetector arrays 3335 form a two-dimensional photodetector arrays.

The electronic transmit signals to the laser arrays may be driven by a switch chip 320 as shown in FIG. 3, or a bridge chip 405 as shown in FIG. 4. Similarly, electronic receive signals from the photodetector arrays may drive a switch chip 320 as shown in FIG. 3, or a bridge chip 405 as shown in FIG. 4. The chip ferrule 314 includes a micro-optic assembly 3325 to multiplex the respective wavelengths $\lambda_1$-$\lambda_4$ in a first half and demultiplex the respective wavelengths $\lambda_1$-$\lambda_4$ in a second half, and therefore referred to as a Coarse Wave Division Multiplex/demultiplex (CWDM) micro-optic assembly. The CWDM micro-optic assembly 3325 may include, for instance, wavelength filters 3630 (only one indicated), mux/demux optical zig-zag path 3600, and a focusing light-turn lens array 3610.

The wavelength filters 3630 of the CWDM micro-optic assembly 3325 selectively pass or block the respective wavelengths $\Delta_1$-$\lambda_4$ from the laser arrays 3330 and to the photodetector arrays 3335, in order for the optical zig-zag block 3600 to multiplex the transmitting and demultiplexing the receiving respective wavelengths $\lambda_1$-$\lambda_4$, and for the light-turn lens array 3610 to direct and focus the multiplexed transmitting wavelengths $\lambda_1$-$\lambda_4$ from the optical zig-zag block 3600 into a first set of fiber array while directing and expanding the receiving multiplexed wavelengths $\Delta_1$-$\lambda_4$ from a second set of fiber array into the optical zig-zag block 3600. When a chip ferrule 314 is modularly inserted on a chip socket 3310 with mechanical alignment features 3620, the CWDM micro-optic assembly 3325 within the chip ferrule 314 is positionally aligned above the laser arrays 3330 and the photodetector arrays 3335.

The CWDM micro-optic assembly 3325 also includes a parallel-fiber termination point 3305 that may directly couple to the light-turn lens array 3610. The parallel-fiber termination point 3305 supports eight ports, one port for each aggregated duplex optical fiber 3315, 3320. As discussed above, the aggregated duplex optical fibers in this example include a transmit/receive optical fiber pair 3315, 3320. Each of the eight transmit optical fiber 3315/receive optical fiber 3320 pairs transports signal of a port of an integrated circuit 360 and connects to the chip ferrule 314.

The ports are not explicitly shown in FIG. 33 so as to illustrate the mapping of the aggregated duplex optical fibers for the Transmit group optical fibers (denoted with a "T" prefix) and Receive group optical fibers (denoted with a "R" prefix), instead. Both the Transmit fiber number group and the Receive fiber number group contains fiber numbers arranged in outwardly ascending order from the middle fibers to the end fibers. For example, T1 and R1 (as a pair) transport Port-1 bidirectional signals in four wavelengths per direction, T2 and R2 (as a pair) transport Port-2 bidirectional signals in four wavelengths per direction, and so on.

This arrangement allows each mating optical connector pair to have the Transmit fiber groups of an optical connector be aligned with the Transmit fiber groups of a mating optical connector, or the Transmit fiber groups of an optical connector to be aligned with the Receive fiber groups of a mating optical connector, while maintaining the fiber order for the ports. The adjacently placed two-dimensional structure of the laser arrays 3330 and the two-dimensional structure of the photodetector arrays 3335 allow the chip ferrule 314 to aggregate eight ports onto an internal MPAC 243 in this example. There may be other number of ports supported by a chip ferrule 314 for other examples.

Figure 34:
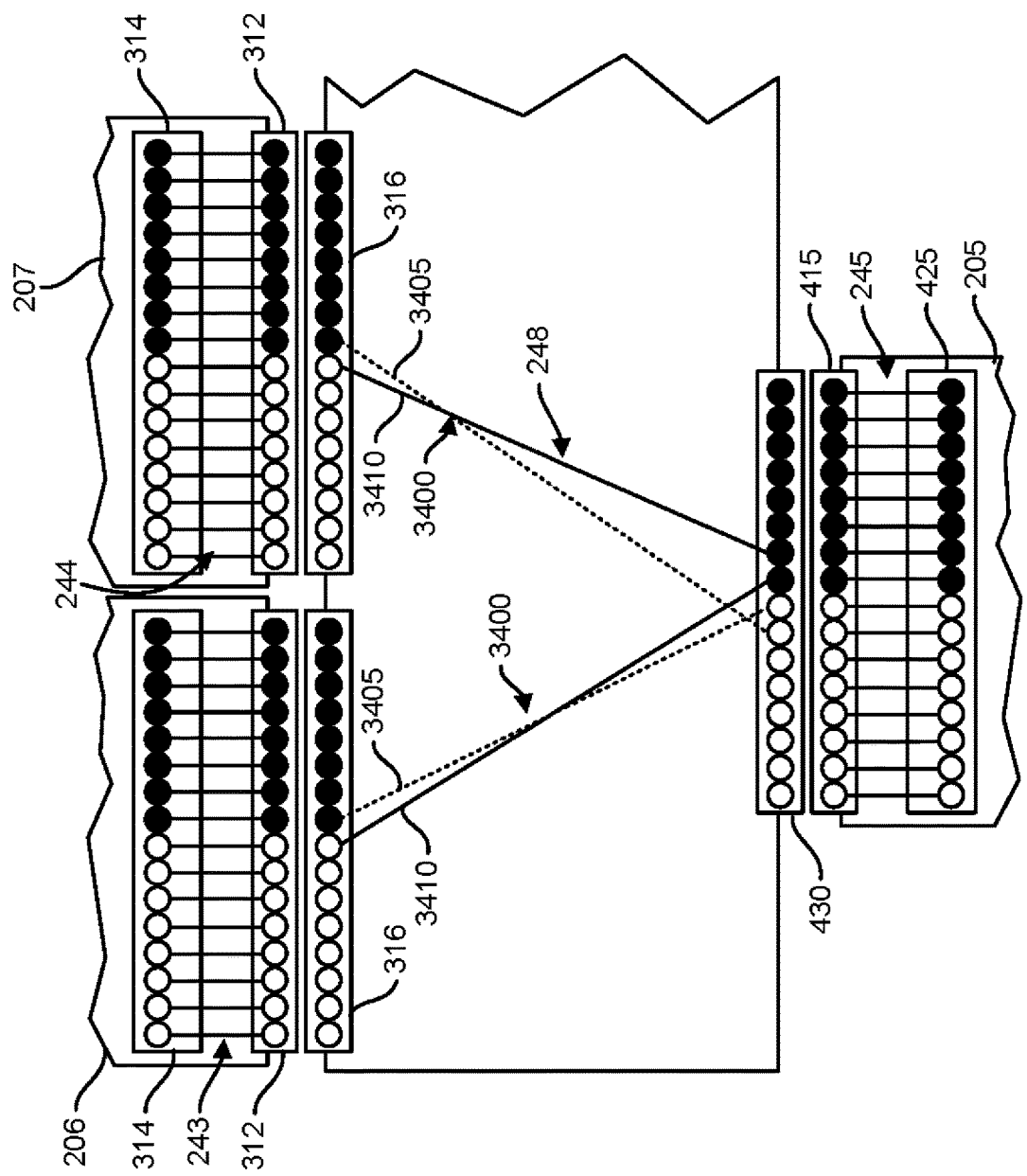

FIG. 34 conceptually depicts the optical connections between the switch line-cards 206, 207 and the blade 205 of the computing systems 210, 211, first shown in FIG. 2. Like parts in FIG. 2, FIG. 3, and FIG. 34 bear like numbers. FIG. 34 does show all the optical connections between the chip ferrules 314 and the optical connectors 312 via the internal MPAC 243. As described above, the optical connectors 312 blind mate with the optical connectors 316 and the optical connections are mapped out in FIG. 34 to show how this mating establishes the optical connections. Not all of the aggregated duplex optical fibers of the internal MPAC 248 are shown so as not to obscure that which is shown.

Two aggregated duplex optical fiber pairs 3400, each pair including an optical fiber 3405 carrying a transmit signal from chip ferrule 314 (which is the same as the receive signal to the chip ferrule 425 via the blind-mate connectors 430, 4150 and an optical fiber 3410 carrying a receive signal to chip ferrule 314 (which is the same as the transmit signal from the chip ferrule 425 via the blind-mate connectors 415, 430) are shown to illustrate two optical port connections between a blade 205 and two switch line-cards 206, 207. Additional optical port connections between the blade 205 and two switch line-cards 206, 207 are not shown so as not to obscure those that are.

The optical connector 430 on one end of the internal MPAC 248 mates with the optical connector 415 of the internal MPAC 245. As described above, the internal MPAC 245 includes not only the optical connector 415 but also the chip ferrule 425. The chip ferrule 425 is affixed to the bridge chip 405, shown in FIG. 4, as described above. Note that the optical connections between the optical connector 415 and the chip ferrule 425 over the internal MPAC 245 are mapped out in FIG. 34.

Figure 35:
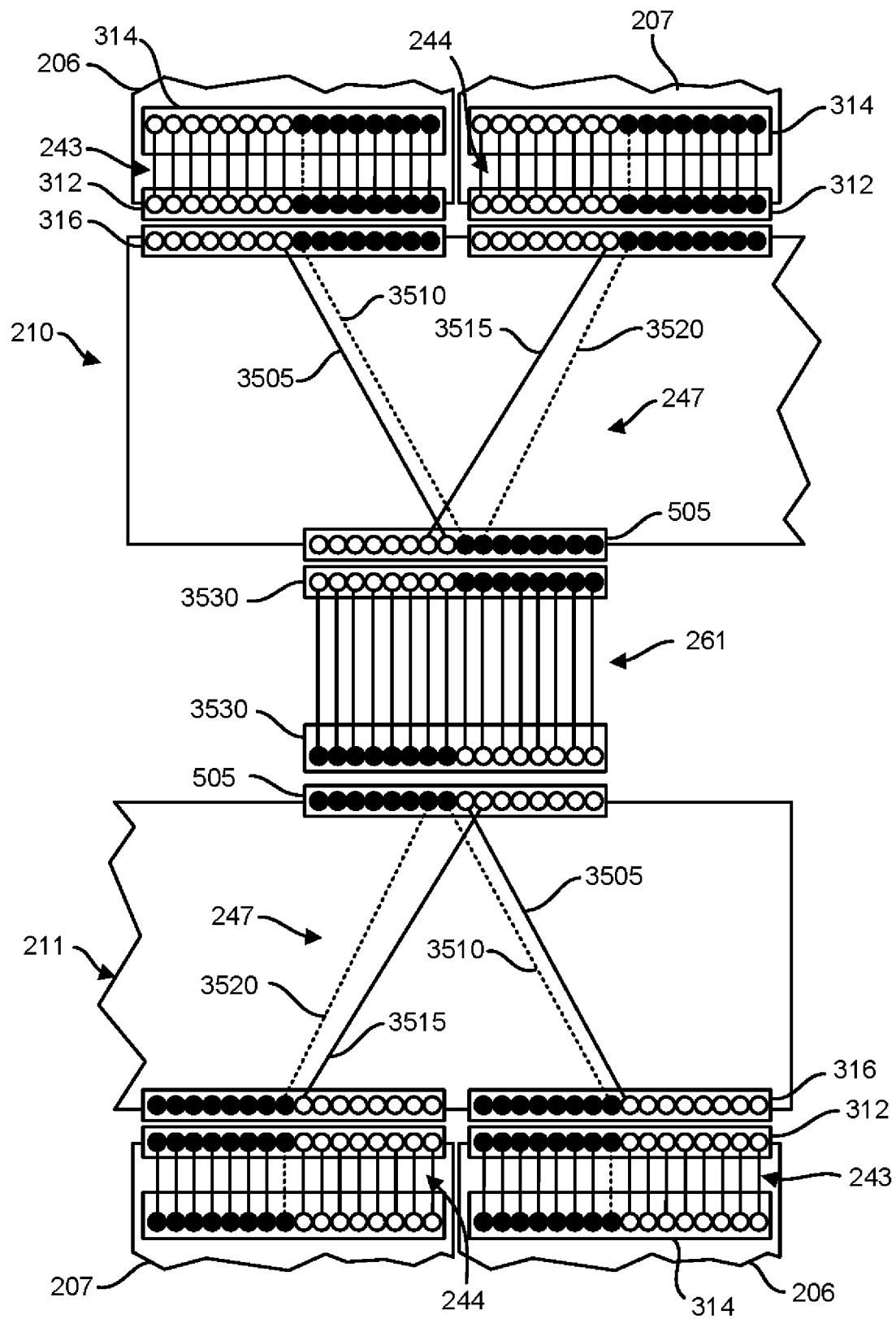

FIG. 35 conceptually illustrates the optical connections between the switch line-cards 206, 207 of the computing system 210 and the switch line cards 206, 207 of the computing system 211 over the external MPAC 261. The switch line-cards 206, 207 are optically connected by the blind-mating of the optical connectors 312, 316. Not all of the aggregated duplex optical fibers of the MPAC 247 are shown so as not to obscure those that are. A receive optical fiber 3505 paired with a transmit optical fiber 3510, for the chip ferrule 314 of the line-card 206 in the computing system 210, define a first aggregated duplex optical fiber and a second receive optical fiber 3515 and second transmit optical fiber 3520, for the chip ferrule 314 of the line-card 207 in the computing system 210, define a second aggregated duplex optical fiber. This description applies similarly to both computing systems 210, 211.

The external MPAC 261 includes optical connectors 3530 on either end that mate with the faceplate optical connectors 505 of the internal MPACs 247. Note that the faceplate connector ends of the external MPAC 261 are keyed (not shown) to correspondingly align the transmit signals and the receive signals of the computing system 210, to the receive signals and the transmit signals of the computing system 211, respectively. An external MPAC 261 may be an off-the-shelf standard MPO cable. The switch line-cards 206, 207 of the computing system 210 are thereby optically connected to the switch line-cards 206, 207 of the computing system 211.

Figure 7:
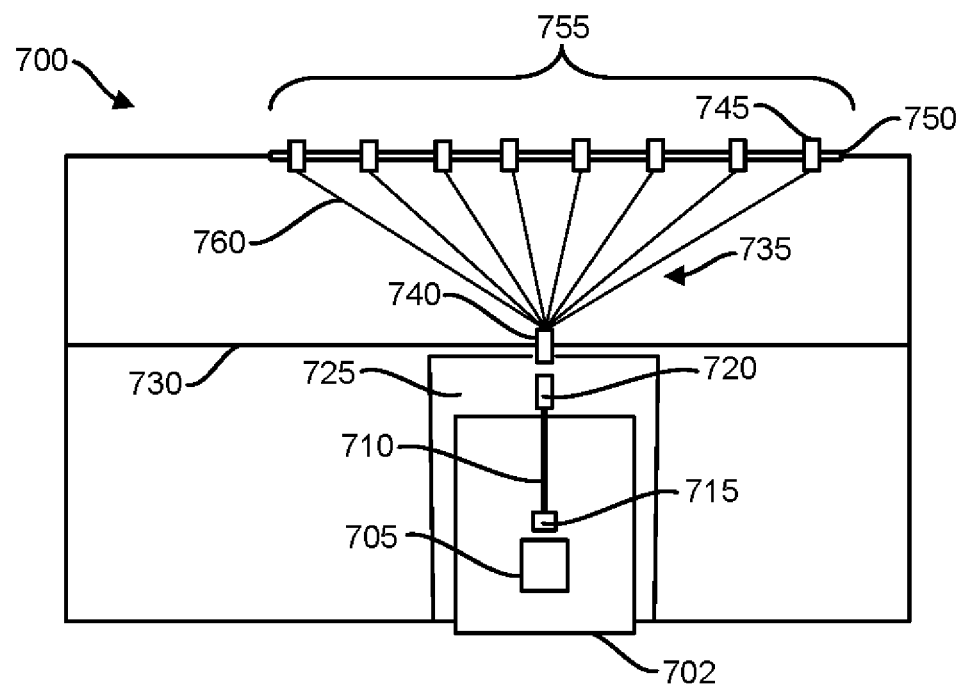
FIG. 7 schematically depicts a serviceable, switch line-card in another example.

As noted above, switch-line-cards such as the switch line-cards 206, 207 of the computing systems 210, 211 shown in FIG. 2 and FIG. 3, may be implemented in alternative examples. FIG. 7 schematically depicts a computing system 700 including a switch line-card 702 that is a serviceable switch module. The switch line-card 702 includes an optical chip 705 and an internal MPAC 710. The internal MPAC 710 includes 16 fibers and is an optical jumper terminating in a chip ferrule 715 on one end and a module blind-mate optical connector 720 on the other. Both the chip ferrule 715 and the blind-mate optical connector 720 support multiple ports. The computing system 700 defines a bay 725 and a midplane 730. The computing system 700 may be a stand-alone switch chassis or a switch module within a blade enclosure.

The computing system 700 includes an internal MPAC 735 that includes a system blind-mate optical connector 740 and a plurality of system faceplate duplex optical connectors 745 (only one indicated) mounted to a faceplate 750 in a system optical interface 755. The internal MPAC 735 comprises a plurality of aggregated duplex optical fibers 760 (only one indicated) as described above and, more particularly, include optical fiber pairs. The aggregated duplex optical fibers 760 fan out from the module blind-mate optical connector 740 to the system faceplate optical connectors 745. Again, the blind-mate optical connector 740 supports multiple ports and each system faceplate optical connector 745 supports a port. The internal MPAC 735 provides a "one to many" connection and so is an optical fiber shuffle.

The switch line-card 702 is inserted into the bay 725. As it is inserted into the bay 725, the module blind-mate optical connector 720 blind-mates with the system blind-mate optical connector 740. The chip 705 may be co-packaged with components having optical interfaces (not shown) for high-density high-bandwidth. In such an example, the chip ferrule 715 supports multiple ports. A port may contain multiple lanes at different wavelengths, where each wavelength is used to modulate a transmit channel or a receive channel as described above relative to FIG. 34. A port with multiple wavelengths may be transported on a pair of optical fibers (one for transmit and the other for receive) of the internal MPAC 710. Hence, the fiber pair implementation of the optical fibers discussed above.

Figure 8:
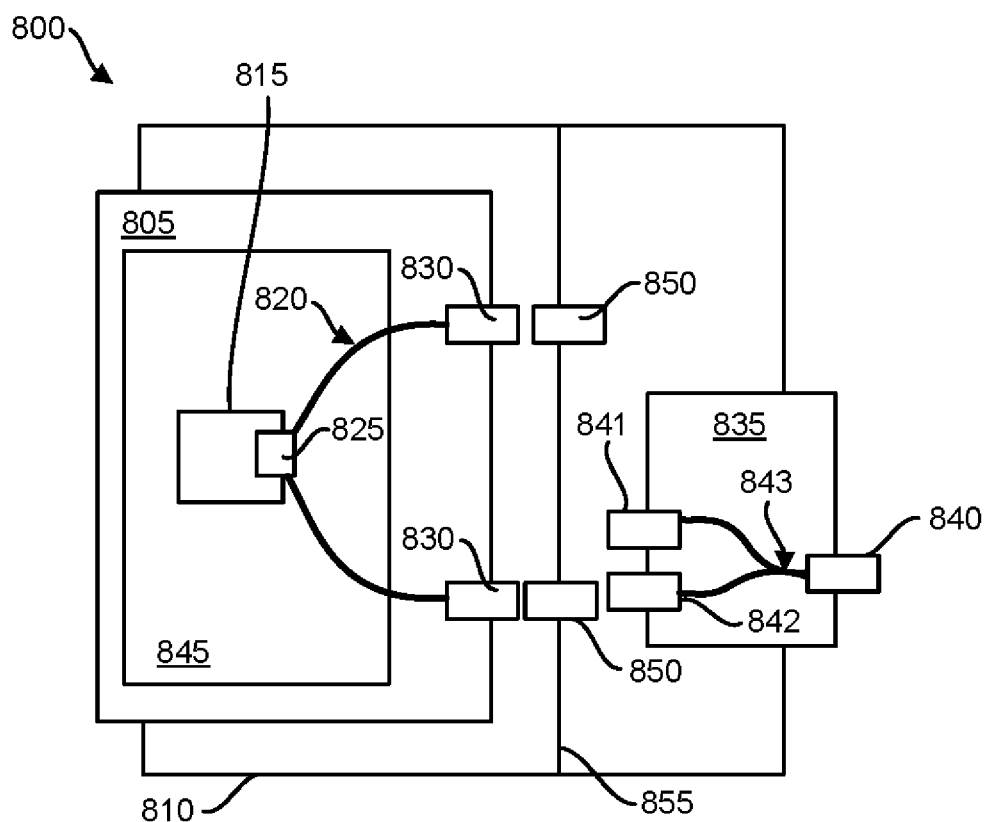
FIG. 8 depicts a computing system including a blade and an interconnect module in accordance with one or more examples.

FIG. 8 depicts a computing system 800 including a blade 805 installed in a blade enclosure 810. The blade 805 is a serviceable blade module with a bridge chip 815 and an internal MPAC 820. The internal MPAC 820 is an optical jumper terminating at one end in a chip ferrule 825 and in a pair of blind-mate optical connectors 830 on the other end. The computing system 800 also includes an interconnect module 835 further including several optical connectors 840-842. The optical connector 840 is a faceplate optical connector and the optical connector 842 is an interconnect blind-mate optical connector. An internal MPAC 843 connects the optical connector 840 to the optical connectors 841, 842.

The blade 805 includes a base board 845 on which the bridge chip 815 is disposed. The bridge chip 805 may be interconnected with other components as part of an assembly including such components and the base board 845. Such components may include, for instance, processors, memory controllers, accelerators, etc. with which the bridge chip 805 might interface. The bridge chip 805 may also be co-packaged with components having optical interfaces for high-density high-bandwidth. The chip ferrule 825 may support multiple ports. A port may contain multiple lanes at different wavelengths, where each wavelength is used to modulate a transmit channel or a receive channel. A port with multiple wavelengths may be transported on a pair of optical fibers (one for transmit and the other for receive) of the optical jumper.

The computing system 800 is assembled by inserting the blade 805 into a bay (not otherwise shown) defined by the blade enclosure 810. The blade enclosure 810 includes a plurality of midplane blind-mate optical connectors 850 mounted on the midplane 855, thereof. As the blade 805 is inserted into the bay, the blind-mate optical connectors 830 blind-mate with the corresponding midplane blind-mate optical connectors 850. The interconnect module 835 is similarly inserted into a separate bay (not otherwise shown) defined by the blade enclosure 810. As the interconnect module 835 is inserted into the bay, the optical connector 850 blind-mates with the midplane blind-mate optical connectors 850 to establish an optical connection between the blade 805 and the interconnect module 835. In various examples, the interconnect module 835 may include switch chips or passive optical fiber shuffle assemblies. The optical fiber shuffle assemblies fan out between multiple ports on a blind-mate optical connector to, for instance, switch chips or faceplate optical connectors, none of which are shown.

The examples illustrated in other figures directly and orthogonally blind-mate optical connectors between blade and switch modules through the midplane. The example of FIG. 8 indirectly and orthogonally blind-mates optical connectors between blade and switch modules via a midplane-mounted optical sleeve. A midplane-mounted optical sleeve as shown in FIG. 8 may be desirable when the midplane cannot have holes to manage air flow within an enclosure. Directly and orthogonally mated optical connectors as shown and discussed elsewhere herein through midplane holes may be desirable in liquid-cooled systems in an enclosure. Directly and orthogonally mated optical connectors through midplane holes may also be desirable in air-cooled systems in an enclosure where midplane may be allowed to have holes when blade and/or switch modules are not installed in the enclosure.

Note that the order in which the blade 805 and interconnect module 835 are assembled into the computing system 800 is not material. Indeed, both the blade 805 and the interconnect module 835 are serviceable and can be removed for service or replacement without impacting the other. In some examples, the blade 805, the interconnect module 835, or both may be hot swappable.

Figure 9:
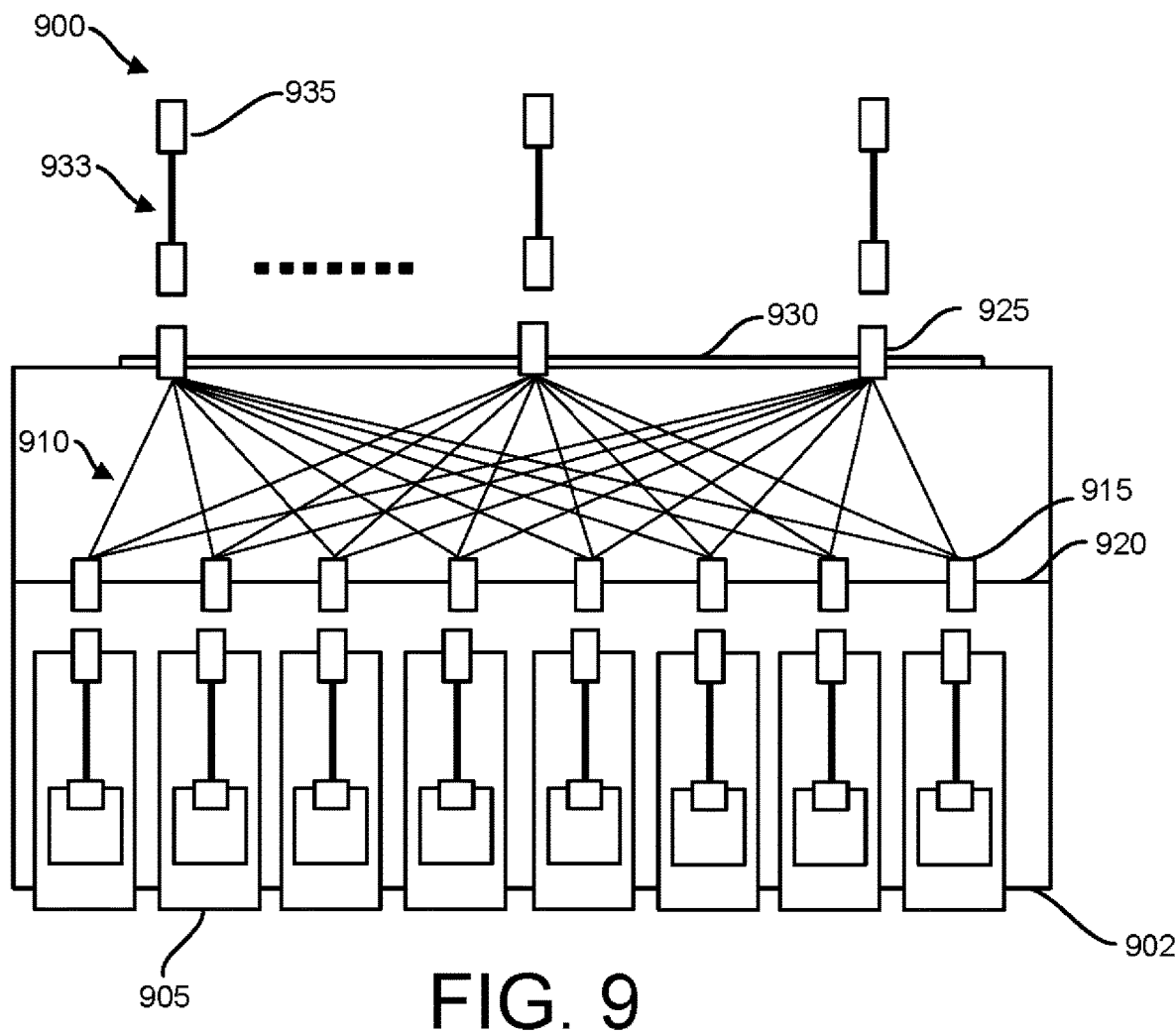
FIG. 9 schematically illustrates a computing system with multiple, serviceable, switch line-cards employing multi-port aggregated cables (MPAC) In accordance with one example.
Figure 10:
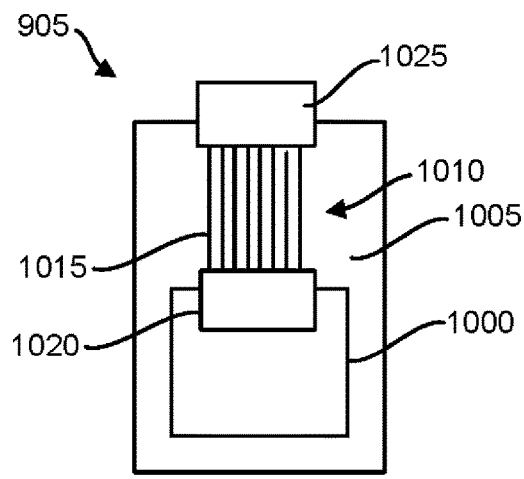
FIG. 10 schematically illustrates selected portions of a line-card such as may be used in the example of FIG. 9.

FIG. 9 schematically illustrates a computing system 900 with multiple, serviceable, switch line-cards employing MPACs in accordance with one example. The computing system 900 includes a switch chassis 902 that houses multiple switch line-cards 905 (only one indicated). FIG. 10 illustrates one particular switch line-card 905 that includes a switch chip 1000 mounted to a base board 1005 and an internal MPAC 1010. The internal MPAC 1010 comprises multiple aggregated duplex optical fibers 1015 (only one indicated). In the illustrated example, the internal MPAC 1010 includes eight duplex optical fibers 1015. The internal MPAC 1010 also includes a chip ferrule 1020 on one end thereof and a blind-mate optical connector 1025 on the other end thereof.

Referring now to FIG. 9 and FIG. 10 collectively, the switch line-cards 905 are serviceable modules, meaning they can be removed for service such as repair or replacement. The switch line-cards 905 are inserted into bays (not otherwise shown) defined by the system chassis 902. The system chassis 902 includes an optical fiber shuffle 910 whose connections are conceptually illustrated. The optical fiber shuffle 910 may include multiple internal MPACs not otherwise shown. The optical fiber shuffle 910 terminates on one end in a plurality of midplane blind-mate optical connectors 915 (only one indicated) mounted to the midplane 920. The optical fiber shuffle 910 terminates on the other end in a plurality of system faceplate optical connectors 925 (only one indicated) mounted to the faceplate 930.

Each of the midplane blind-mate optical connectors 915 supports multiple ports (not otherwise shown). In the illustrated example, each of the midplane blind-mate optical connectors 915 supports eight ports (only three shown). In the illustrated example, the system faceplate optical connectors 925 support eight ports. The ports from the midplane blind-mate optical connectors 915 fans out to ports (not otherwise shown) on system faceplate optical connectors 925, and vice versa, creating the optical fiber shuffle assemblies (internal MPACs) that make up the optical fiber shuffle 910.

Note that only three system faceplate optical connectors 925 are shown, although there are eight totals in this example. The five not shown have been omitted for the sake of clarity as so as not to obscure the optical connections between the illustrated system faceplate optical connectors 925 and the midplane blind-mate optical connectors 915. In practice, there will be one optical connection between each system faceplate optical connector 925 and each midplane blind-mate optical connector 915 over an optical fiber of the optical fiber shuffle 910. Each midplane blind-mate optical connector 915 will therefore have eight optical connections through the optical fiber shuffle 910, one to each of the system faceplate optical connectors 925. Each of the system faceplate optical connectors 925 will also have eight optical connections through the optical fiber shuffle 910, one to each of the midplane blind-mate optical connectors 915.

Each of the system faceplate optical connectors 925 and each of the midplane blind-mate optical connectors 915 includes eight ports, not separately shown, that may be referenced as port-1 to port-8. Each port-1 of each midplane blind-mate optical connector 915 is aggregated on the internal MPAC shuffle 910 and exposed on one faceplate optical connector 925. So, when an external MPAC 933 connects two faceplate optical connectors 925 of two different computing systems, Port-N of switch-M in enclosure-1 connects to Port-N of switch-M in enclosure-2 as will be discussed below. Traditionally, eight cables would be needed to connect eight corresponding ports instead of a single MPAC as in this example. This method is useful when corresponding ports of multiple (e.g., 8) planes of switches need to be connected for some fabric topologies.

A plurality of external MPACs 933 (only one indicated) connect to the system faceplate optical connectors 925. The optical connector 935 of the external MPAC 933 also supports a plurality of ports (not otherwise shown) that are the same in number as that supported by the system faceplate optical connectors 925. In the illustrated example, the optical connector 935 supports eight ports. The external MPACs 933 may be used to connect the computing system 900 as shown in FIG. 11, for instance, and as will now be discussed.

Figure 11:
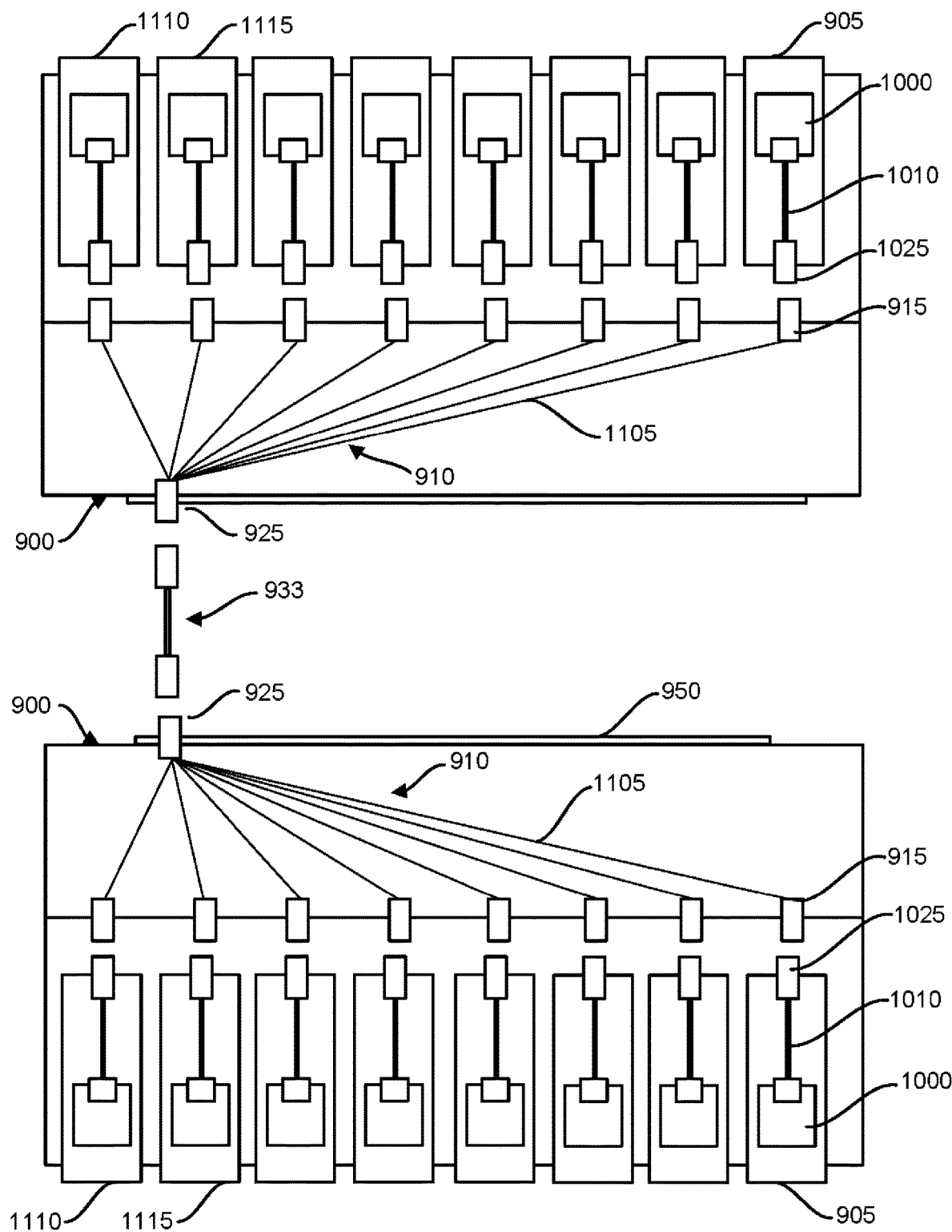
FIG. 11 illustrates how optical connections can be made between two computing systems such as the one shown in FIG. 9 using external MPACs In accordance with one example.

Turning now to FIG. 11, two computing systems 900 are optically connected by an external MPAC 933 through system faceplate optical connectors 925. Only the one optical connection is shown even though, as implied in FIG. 9, there typically will be several. The other optical connections that might be expected have been omitted for the sake of clarity and so as to promote greater understanding of the subject matter disclosed herein.

Each computing system 900 includes a plurality of switch line-cards 905 (only one indicated) as discussed relative to FIG. 9. Each switch line-card 905 includes a switch chip 1000 and an internal MPAC 1010 including eight aggregated duplex optical fibers (not separately shown) and terminating in a blind-mate optical connector 1025 as discussed relative to FIG. 10. Each blind-mate optical connector 1025 supports eight ports, one port for each of the aggregated duplex aggregated fibers 1010. When assembled, the switch line-cards 905 mate with the midplane blind-mate optical connectors 915.

The midplane blind-mate optical connectors 1025 are optically connected through an internal MPAC 910 to the system faceplate optical connector 925. The MPAC 910 includes, in this example, eight aggregated duplex optical fibers 1105 (only one indicated). The midplane blind-mate optical connectors 915 and the system faceplate optical connectors 925 each support eight ports and the MPAC 910 includes one aggregated duplex optical fiber 1105 from a respective one port of each of the midplane blind-mate optical connectors 915 to a respective port of the system faceplate optical connector 925.

Note that only one system faceplate optical connector 925 is shown, although there are eight totals in this example as described above relative to FIG. 9. The seven not shown have been omitted for the sake of clarity as so as not to obscure the illustrated optical connections between the illustrated system faceplate optical connector 925 and the midplane blind-mate optical connectors 915. In practice, there will be one optical connection between each system faceplate optical connector 925 and each midplane blind-mate optical connector 915 over an optical fiber of the optical fiber shuffle 910. Each midplane blind-mate optical connector 915 will therefore have eight optical connections through the optical fiber shuffle 910, one to each of the system faceplate optical connectors 925. Each of the system faceplate optical connectors 925 will also have eight optical connections through the optical fiber shuffle 910, one to each of the midplane blind-mate optical connectors 915.

As described above, then, Port-N of switch-M in enclosure-1 connects to Port-N of switch-M In enclosure-2. Port-1 (not separately shown) of the first switch line-card 1110 of one computing system 900 connects to port-1 (not separately shown) of the first switch line-card 1110 of the second computing system 900. Similarly, port-3 (not separately shown) of a second switch line-card 1115 is optically connected to port-3 (not separately shown) of the second switch line-card 1115 in the other computing system 900. The principle may be extended through each of the ports of each of the switch line-cards of each of the computing systems 900. Traditionally, eight cables would be needed to connect eight corresponding ports instead of the single MPAC 933.

Figure 12:
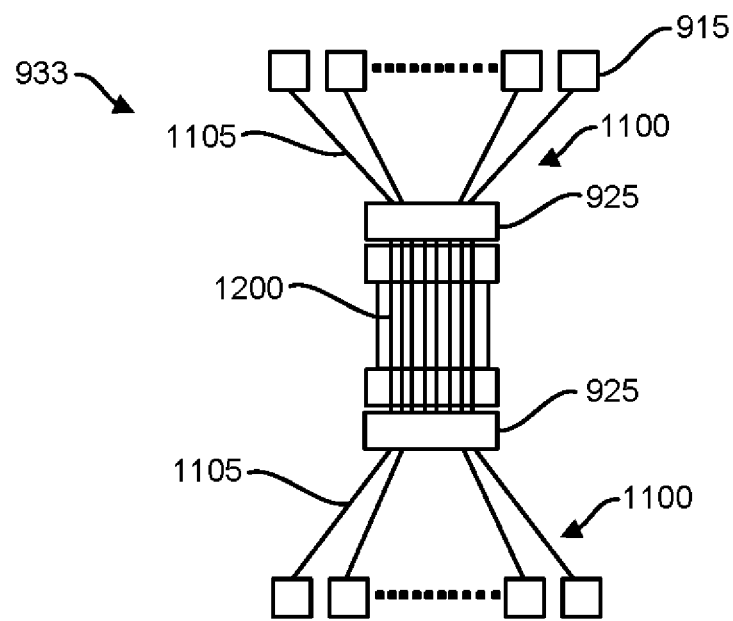
FIG. 12 illustrates the external MPAC of FIG. 9 and FIG. 11 in greater detail.

The external MPAC 933 is shown in better detail in FIG. 12. The external MPAC 933 supports eight ports and includes eight aggregated duplex optical fibers 1200 (only one indicated). In this example, the aggregated duplex optical fibers are fiber pairs, and so there are 16 actual fibers defined in eight transmit and receive pairs as aggregated duplex optical fibers 1200. Thus, through the external MPAC 933 and the fiber assembly shuffles 910 (shown in FIG. 9), one port of a switch line-card 905 in one computing system 900 can communicate with another corresponding port of a corresponding switch line-card 905 in another computing system 900.

Accordingly, internal MPACs may be optical fiber shuffle assemblies or fiber jumpers. In an optical fiber shuffle each faceplate optical connector fans out fibers to multiple blind-mate optical connectors and each blind-mate optical connector fans out fibers to multiple faceplate optical connectors. In a fiber optical jumper, each blind-mate optical connector fans out fibers to one or multiple chip ferrules. External MPACs may be straight fibers, such as off-the-shelf standard MPO cables. Multiple internal and external MPACs may connected in sequence for chip-to-chip interconnections among multiple switches.

Figure 13:
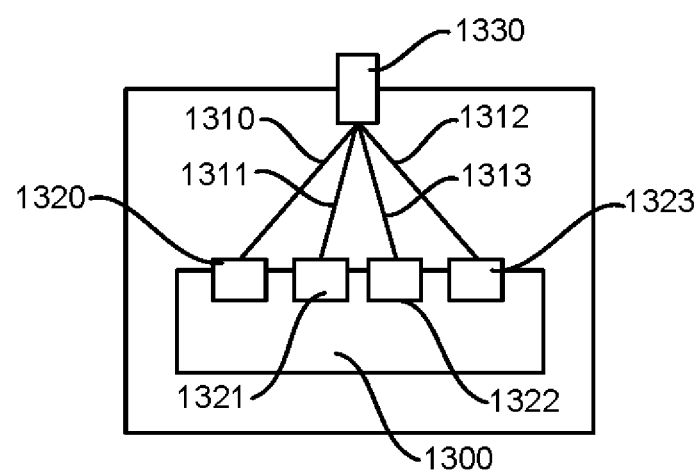
FIG. 13 illustrates a multiple chip ferrule example, wherein a single chip interfaces with four internal MPACs, each internal MPAC terminating on one end in a respective chip ferrule and on the other end with blind-mate connector.

Note that not all examples will include a 1:1 correspondence in ports and aggregated duplex optical fibers as is seen across the optical connections in FIG. 9-FIG. 12. The examples of FIG. 1 through FIG. 6, for instance, do not have such a 1:1 correspondence. This will be an implementation specific detail that may vary across examples. Still other variations may be realized. For instance, FIG. 13 illustrates a multiple chip ferrule example, wherein a single chip 1300—which may be either a switch chip or a bridge chip—interfaces with four internal MPACS 1310-1313, each internal MPAC 1310-1313 terminating on one end in a respective chip ferrule 1320-1323 and on the other end with blind-mate optical connector 1330. Another example (not shown) includes multiple (e.g., two) blind-mate optical connectors 1330 and runs duplex optical fibers between two blind-mate and four chip ferrules, resulting in a shuffle.

Figure 14:
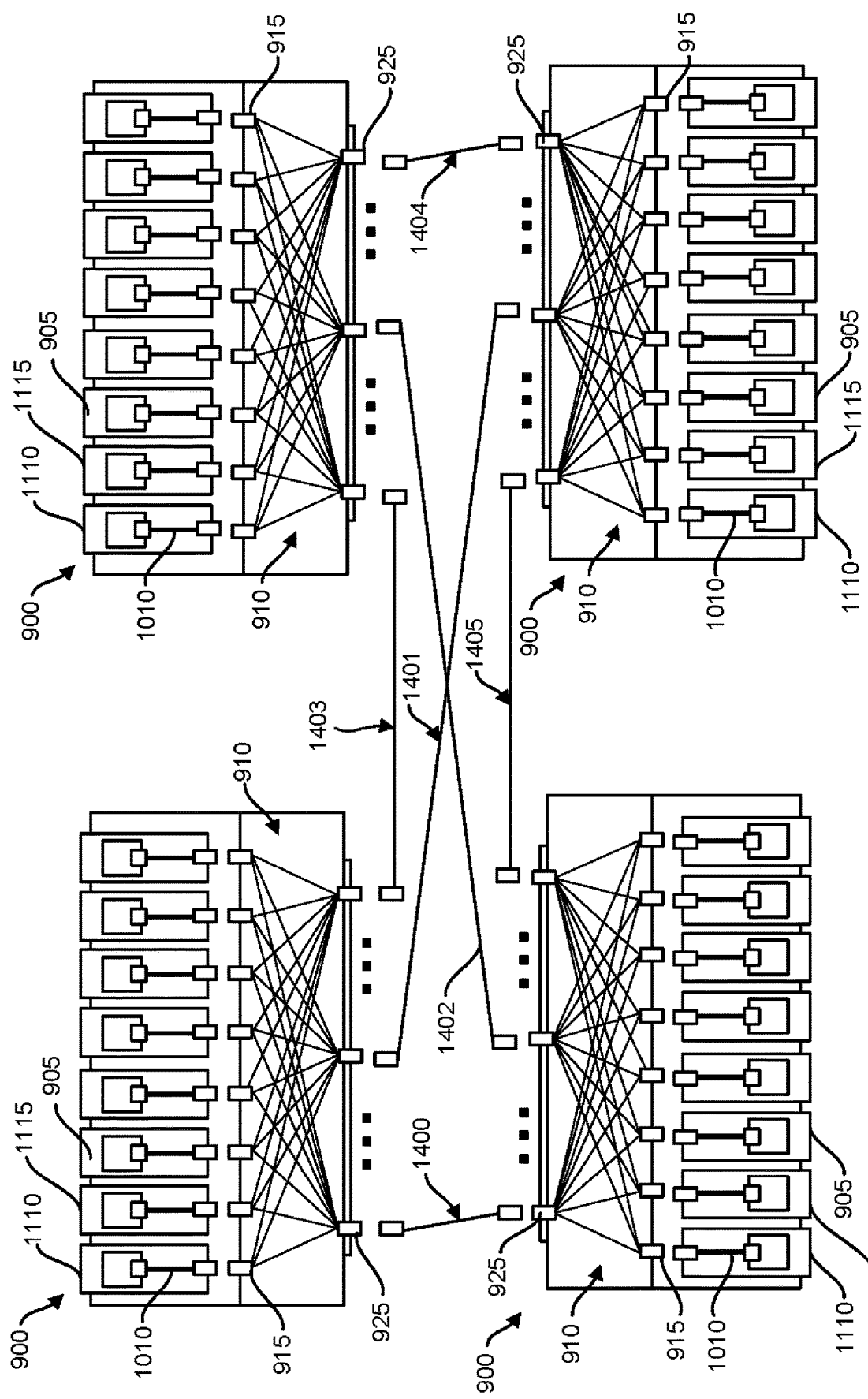
FIG. 14 illustrates an "all to all" connection using both internal and external MPACs amongst four computing systems in accordance with one example.

Other connection topologies may be implemented. FIG. 14 illustrates an "all to all" connection amongst four computing systems 900 as described above in FIG. 9-FIG. 12. The four computing systems 900 are all interconnected by external MPACs 1400-1405, each of the external MPACs 1400 being similar in structure to the external MPAC 933 as shown in FIG. 12. Those in the art having the benefit of this disclosure will be able to readily recognize still other topologies with which the present disclosure may be used to implement.

Note that only three system faceplate optical connectors 925 are shown for each of the computing systems 900, although there are eight total for each computing system 900 as described above. The five not shown for each computing system 900 have been omitted for the sake of clarity as so as not to obscure the illustrated optical connections between the illustrated system faceplate optical connectors 925 and the midplane blind-mate optical connectors 915. In practice, there will be one optical connection between each system faceplate optical connector 925 and each midplane blind-mate optical connector 915 over an optical fiber of the optical fiber shuffle 910 in each computing system 900. Each midplane blind-mate optical connector 915 will therefore have eight optical connections through the optical fiber shuffle 910, one to each of the system faceplate optical connectors 925 in each computing system 900. Each of the system faceplate optical connectors 925 will also have eight optical connections through the optical fiber shuffle 910, one to each of the midplane blind-mate optical connectors 915.

As described above, then, Port-N of switch-M in enclosure-1 connects to Port-N of switch-M in enclosure-2. Port-1 (not separately shown) of the first switch line-card 1110 of one computing system 900 connects to port-1 (not separately shown) of the first switch line-card 1110 of the second computing system 900. Similarly, port-3 (not separately shown) of a second switch line-card 1115 is optically connected to port-3 (not separately shown) of the second switch line-card 1115 in the other computing system 900. The principle may be extended through each of the ports of each of the switch line-cards of each of the computing systems 900. Traditionally, eight cables will be needed (instead of one MPAC) to connect eight corresponding ports between any two computing systems 900. The use of MPACs such as is disclosed herein thereby reduces the number of external cabling in a fabric like that shown in FIG. 14 by a factor of eight.

In another example, a multi-port aggregated cable (MPAC) may interconnect two switch systems where each switch system includes at least two switch chips. The MPAC may include multiple aggregated duplex optical fibers where each duplex optical fiber supports a switch port. The switch chips may include multiple switch ports.

In some examples, a MPAC may be an external cable connecting two switch systems. The external MPAC may be an optical cable with 1-to-1 fiber connections between two optical connectors. The external MPAC may be optical fiber assembly with at least two optical connectors on one side and at least two other optical connectors on the other side of optical fibers.

In other examples, a MPAC may be an internal fiber assembly connecting optical connectors to at least two switch chips within a switch system. The optical connectors may be faceplate optical connectors or blind-mate optical connectors where each optical connector supports multiple duplex optical fibers.

In still other examples, a MPAC may be an internal fiber assembly connecting optical connectors to at least one bridge chip within a computing system. The optical connectors may be faceplate optical connectors or blind-mate optical connectors. The optical connectors may support multiple duplex optical fibers. The internal fiber assembly may be a fan-out jumper comprising one optical connector on one side and at least two optical connectors on the other side of optical fibers. Or, the internal fiber assembly may be an optical fiber shuffle having at least two optical connectors on one side and at least two other optical connectors on the other side of optical fibers.

In some examples, a computing system and a switch system may be interconnected directly within a blade enclosure where a MPAC in the computing system and a MPAC in the switch system are directly connected. In some examples, multiple MPACs may be interconnected in sequence.

To further an understanding of the subject matter claimed below, four particular example use cases will now be discussed.

Figure 15:
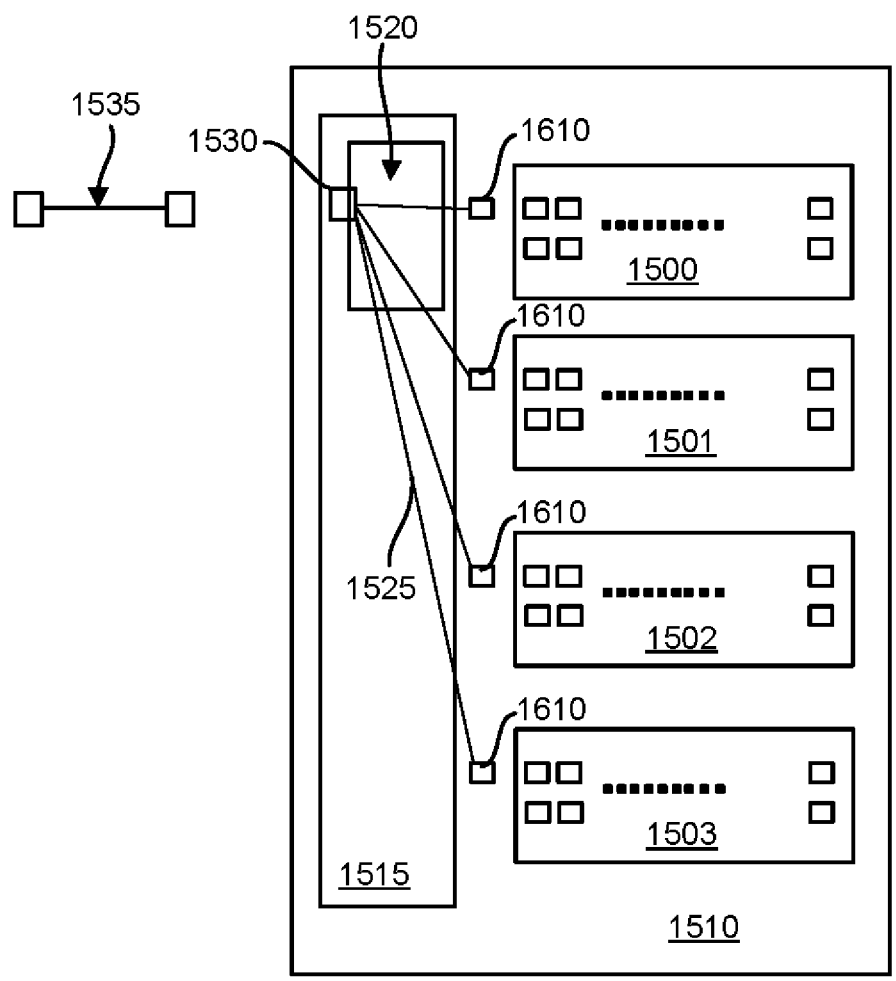
FIG. 15 schematically depicts a first use case for internal and external MPACs.
Figure 16:
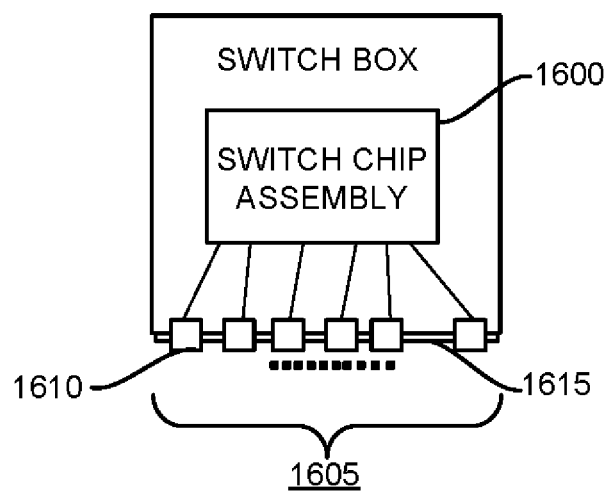
FIG. 16 graphically illustrates a switch box such as may be employed in the use case of FIG. 15.

FIG. 15 schematically depicts a first example use case in which a switch boxes are disposed in a rack with MPAC fan-out assemblies. A plurality of switch boxes 1500-1503 are disposed in a rack 1510 that also encloses a rack plenum 1515. As shown in FIG. 16, each of the switch boxes 1500-1503 includes a switch chip assembly 1600 and an optical interface 1605 including a plurality of single-port, one-lane duplex optical connectors 1610 (only one indicated) on a switch box faceplate 1615. The switch chip assembly 1600 may contain a switch chip and optical transceivers (none of which are separately shown) where the optical transceivers may be modularly installable, mid-board optics or co-packaged.

An external MPAC 1520 includes multiple aggregated duplex optical fibers 1525 (only one indicated) from the multiple switch boxes 1500-1503 in the rack 1510 (one cable 1525 from each of the switch boxes 1500-1503). The cables 1525 are aggregated within an optical connector 1530 to interface to an external MPAC 1535 straight-fiber cable assembly. The optical connector 1530 is disposed on the rack plenum 1515. The external MPAC 1520 is a fan-out assembly and provides optical fiber coupling between the rack MPAC optical connector 1530 and the switch faceplate single-port duplex optical connectors 1610.

Figure 17:
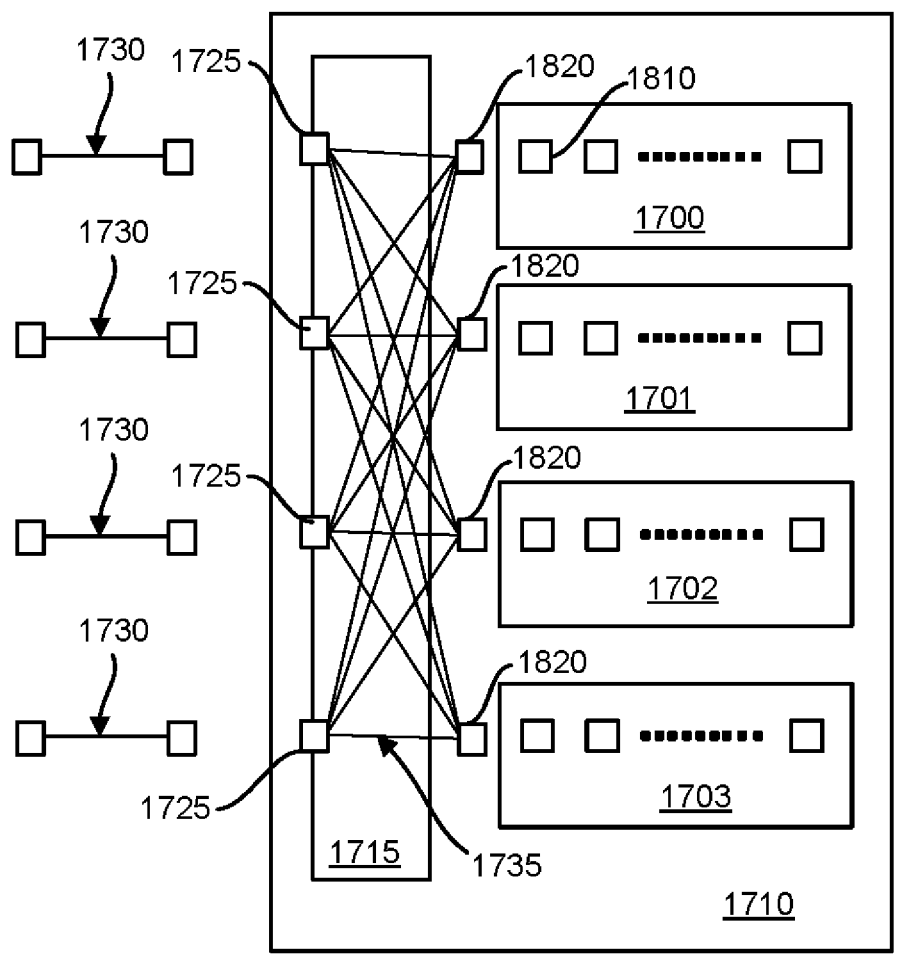
FIG. 17 schematically depicts a second use case for internal and external MPACs.
Figure 18:
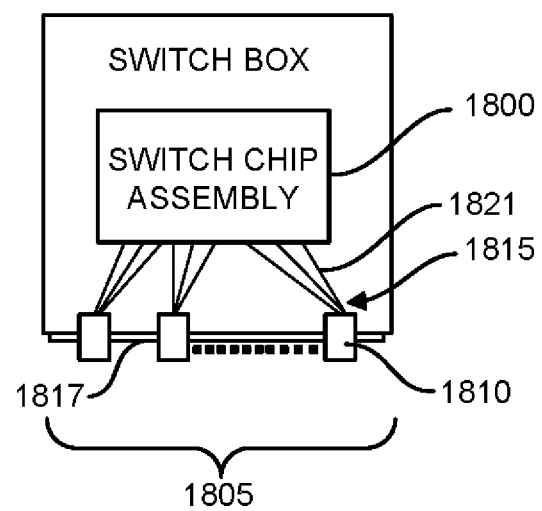
FIG. 18 graphically illustrates a switch box such as may be employed in the use case of FIG. 17.

FIG. 17 schematically depicts a second use case with switch boxes in a rack with MPAC shuffle assemblies. A plurality of switch boxes 1700-1703 are disposed in a rack 1710 that also encloses a rack plenum 1715. As shown in FIG. 18, each of the switch boxes 1700-1703 includes a switch chip assembly 1800 and an optical interface 1805 including a plurality of switch faceplate optical connectors 1810 (only one indicated) on a switch box faceplate 1817. The switch chip assembly 1800 may contain a switch chip and optical transceivers (none of which are separately shown) where the optical transceivers may be modularly installable, mid-board optics or co-packaged. The switch faceplate optical connectors 1810 are connected to the switch chip assembly 1800 via a plurality of internal MPACs 1815 (only one indicated). Each internal MPAC 1815 includes multiple aggregated single-port cables 1821 (only one indicated).

Returning to FIG. 17, the optical connections for one switch faceplate optical connector 1810 of each switch box 1700-1703 is shown for clarity. Multiple multi-port aggregated cables 1820 (only one indicated) are connected between multiple switch boxes 1700-1703 in the rack 1710. There is one cable 1820 from each switch in each of the switch boxes 1700-1703. Fiber fan-in on each optical connector 1820 may be bundled and contained within a protected jacket within the rack plenum 1715, in a way that the cable end containing the optical connector 1820 can be easily handled to connect to different switch faceplate optical connectors. The cables 1820 are aggregated within multiple rack optical connectors 1725 to interface to multiple external MPACs 1730. The rack optical connectors 1725 are disposed on the rack plenum 1715. The MPAC shuffle assembly 1735, only partially shown, provides optical fiber coupling among the rack optical connectors 1725 and the switch faceplate optical connectors 1810.

Figure 19:
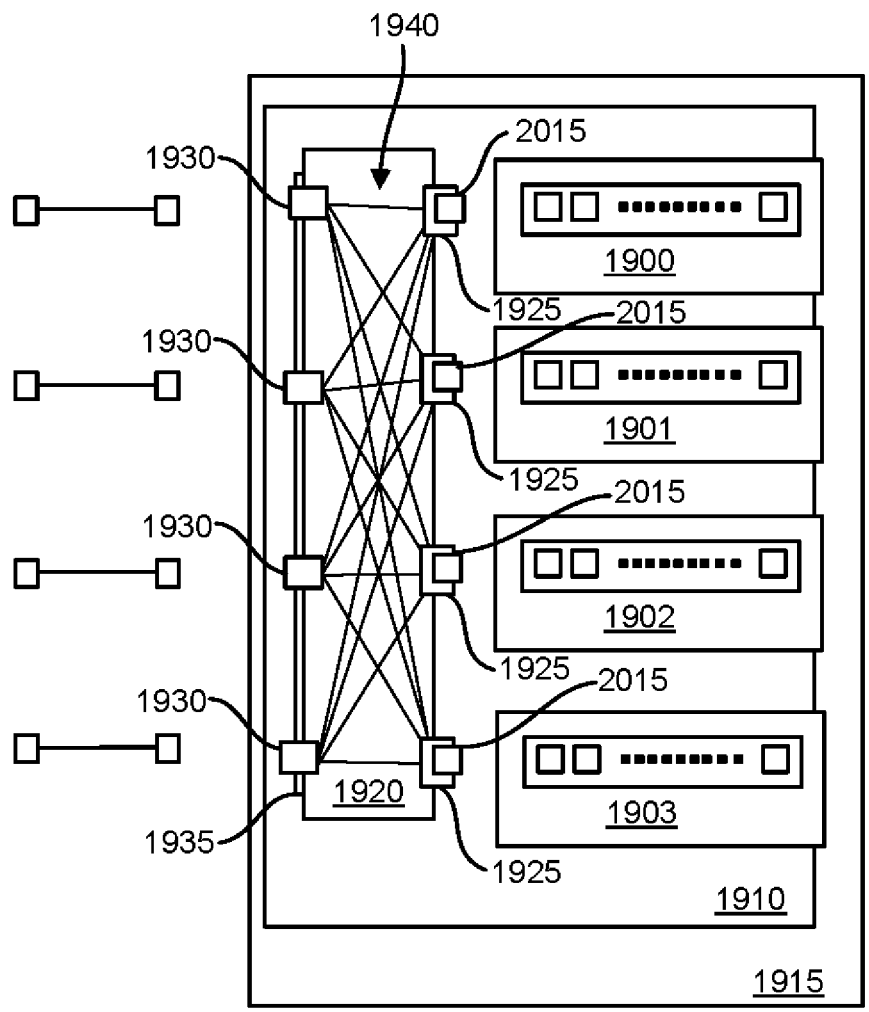
FIG. 19 schematically depicts a third use case for internal and external MPACs.
Figure 20:
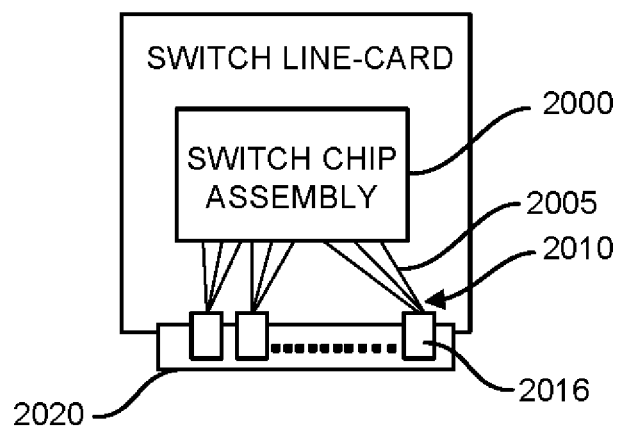
FIG. 20 graphically illustrates a switch box such as may be employed in the use case of FIG. 19.

FIG. 19 schematically depicts a third use case for internal and external MPACs. A plurality of switch line-cards 1900-1903 are mounted in a switch chassis 1910 that is in turn mounted in a rack 1915. The switch chassis 1910 also includes a shuffle tray 1920. As shown in FIG. 20, each switch line-card 1900-1903 includes a switch chip assembly 2000. The switch chip assembly 2000 may contain a switch chip and optical transceivers (none of which are separately shown) where the optical transceivers may be modularly installable, mid-board optics or co-packaged.

Multiple single-port internal cables 2005 (only one indicated) are aggregated into internal MPACs 2010 on a blind-mate optical connector 2016 (only one indicated) disposed in a line-card-side blind-mate housing 2020. Each blind-mate optical connector 2016 blind-mates to a complementary switch midplane optical connector 2015 that are contained in chassis-side blind-mate housing 1925 disposed on the midplane of the switch chassis 1910 defined by the shuffle tray 1920. A plurality of faceplate optical connectors 1930 are mounted to a switch chassis faceplate 1935. A MPAC shuffle assembly 1940 then provides optical fiber coupling among the switch faceplate optical connectors 1930 and the switch midplane optical connectors 2015. Thus, multiple single-port internal cables 2005, shown in FIG. 20, from multiple switch line-cards 1900-1903 in the switch chassis 1910 are aggregated within multiple optical connectors 2016 are blind-mate to 2015, and are interfaced to multiple switch faceplate optical connectors 1930 via the shuffle assembly 1940.

Figure 21:
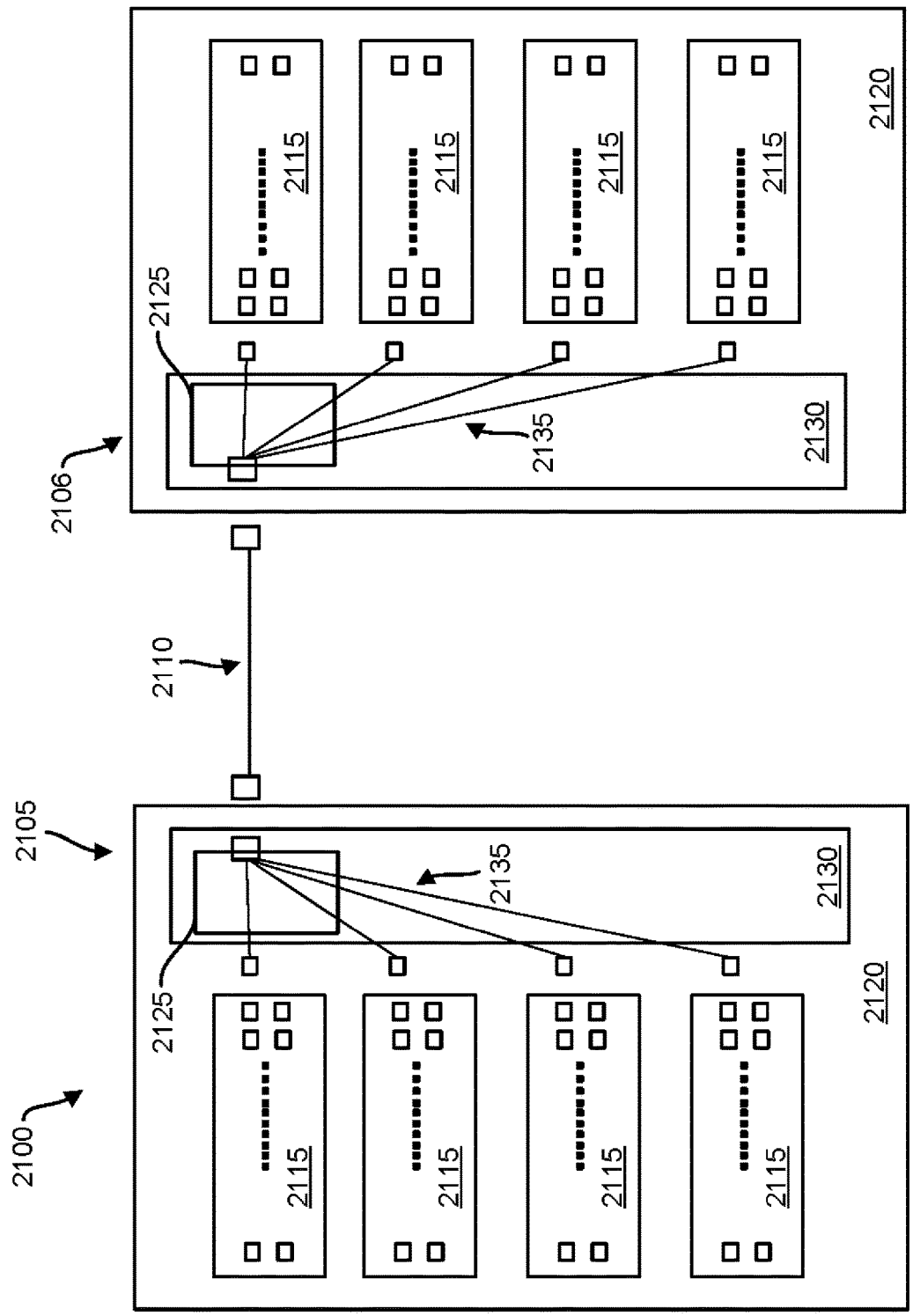
FIG. 21 schematically depicts an example deployment of the third use case in FIG. 19-FIG. 20.
Figure 22:
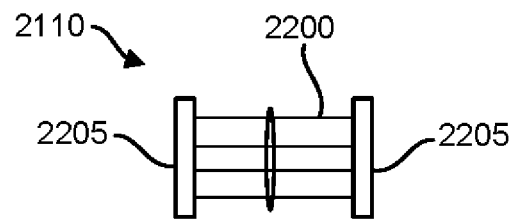
FIG. 22 schematically illustrates the external MPAC in the deployment shown in FIG. 21.

FIG. 21 schematically depicts an example deployment of the third use case in FIG. 19 and FIG. 20. In this deployment, a system 2100 includes two computing systems 2105, 2106 interconnected by an external MPAC 2110. Each of the computing systems 2105, 2106 includes a plurality of switch boxes 2115 housed in a rack 2120. Each of the computing systems 2105, 2106 also includes an interconnect module 2125 disposed in a rack plenum 2130 mounted in the rack 2120.

Each of the switch boxes 2115 is optically connected to the interconnect module 2125 through an internal MPAC 2135. The interconnect modules 2125 of the computing systems 2105 and 2106 are then optically connected through the external MPAC 2110. Note that only one connection between the computing systems 2105, 2106 is shown, but because of the use of external MPACs 2110, each switch port of the switch boxes 2115 in the computing system 2105 is optically connected to its corresponding counterpart switch port of the corresponding switch boxes 2115 in the computing system 2106.

Figure 23:
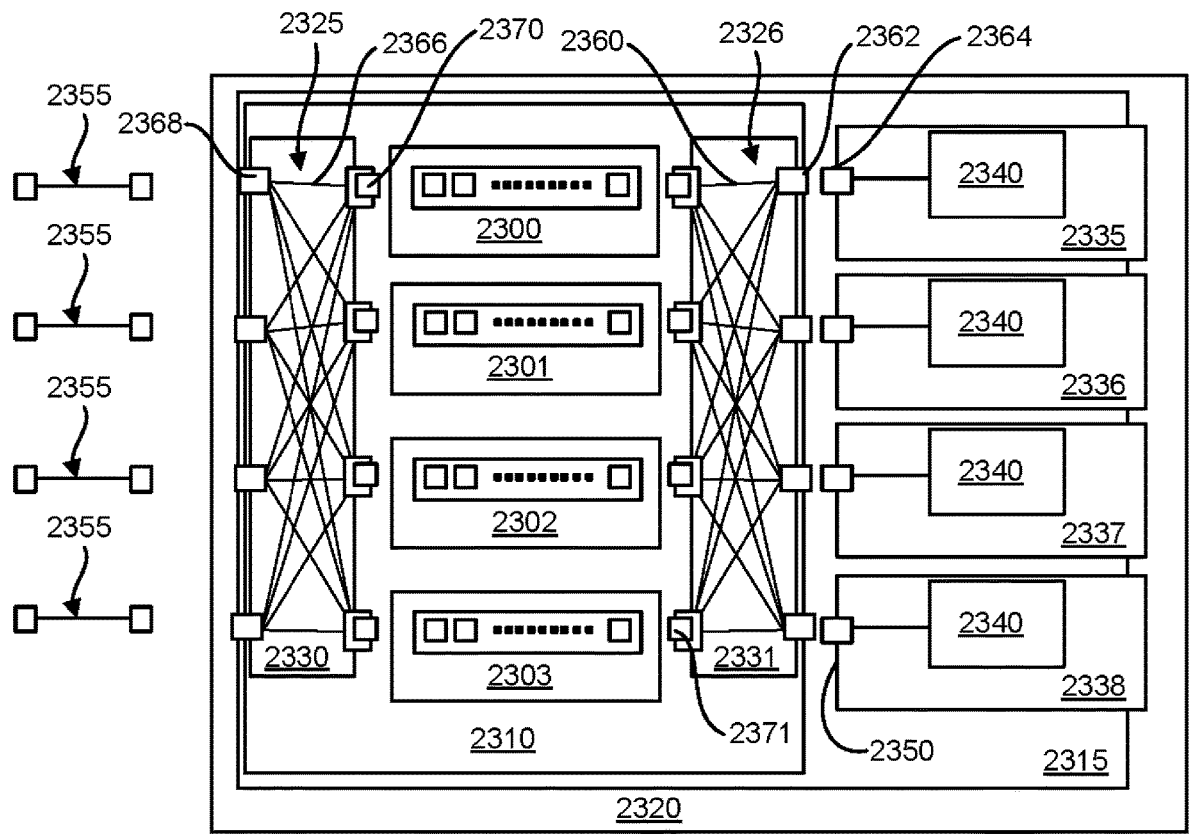
FIG. 23 schematically depicts a third use case for internal and external MPACs.

FIG. 23 schematically depicts a fourth use case for internal and external MPACs. Multiple switch line-cards 2300-2303 are mounted within a switch sub-enclosure 2310 that is, in turn, mounted In an enclosure 2315. The switch line-cards 2300-2303 are, in this example, hot-serviceable. The enclosure 2315 is mounted in a rack 2320.

Figure 24:
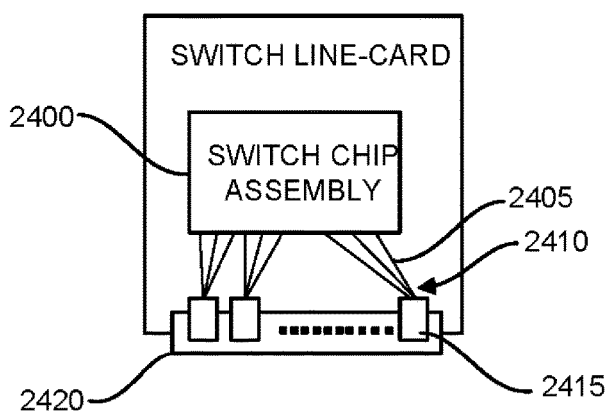
FIG. 24 graphically illustrates a switch box such as may be employed in the use case of FIG. 23.

As shown in FIG. 24, each switch line-card 2300-2303 includes a switch chip assembly 2400. The switch chip assembly 2400 may contain a switch chip and optical transceivers (none of which are separately shown) where the optical transceivers may be modularly installable, mid-board optics or co-packaged. Multiple single-port internal cables 2405 (only one indicated) are aggregated into internal MPACs 2410 on a blind-mate optical connector 2415 (only one indicated) disposed in a midplane blind-mate housing 2420.

A pair of internal MPACs shuffle assemblies 2325, 2326 are respectively disposed in shuffle trays 2330, 2331 within the switch sub-chassis 2310. The MPACs 2325, 2326 are optical fiber shuffle assemblies providing "many to many" connections. A plurality of compute nodes 2335-2338 are disposed within the enclosure 2315. The compute nodes 2335-2338 are, in this particular example, hot-serviceable compute nodes. Each compute node 2335-2338 includes a switch interface chip 2340, and an internal MPAC 2345 (only one indicated). The internal MPAC 2345 is connected to the switch interface chip 2340 by a chip ferrule (not shown) and includes a MPAC optical connector 2350 (only one indicated). The internal MPAC 2345 is an optical fiber jumper.

Each of the compute nodes 2335-2338 is optically connected to each of the switch line-cards 2300-2303 through the internal MPAC shuffle assembly 2326. Each of the switch line-cards 2300-2303 is optically connected to each of the external MPACs 2355 through the internal MPAC shuffle assembly 2325. Accordingly, a network port in each of the compute nodes 2335-2338 can be routed to each of the external MPACs 2355 via the internal MPAC shuffle assembly 2326, one of the switch line-cards 2300-2303, and the internal MPAC shuffle assembly 2325.

"Optical connection" in this context means optical signals going through one or more components having optical interfaces. Switches most likely have electronic switching circuits where the switch ports have optical transceivers to connect to other switches or compute nodes. Therefore, in FIG. 23, a compute node 2335-2338 cannot be optically connected to an external MPAC 2355, but the fabric port traffic of a compute node 2335-2338 can be routed to an external MPAC 2355 via the switches 2300-2303 and the optical shuffle assemblies 2326, 2325.

Thus, in this use case, multiple single-port internal cables 2360 (only one indicated) are aggregated into the internal MPAC 2326, then on a MPAC midplane blind-mate optical connector 2362 (only one indicated), that mates to a complementary midplane MPAC optical connector 2364 disposed on compute nodes 2335-2338. A MPAC shuffle assembly 2326 provides optical fiber coupling among the midplane blind-mate optical connectors 2362 and the switch internal bulkhead MPAC optical connectors 2371 (only one indicated) that are disposed on an internal bulkhead (not shown) within the switch sub-chassis 2310. Multiple single-port internal cables 2366 (only one indicated) from multiple switch line-cards 2300-2310 in a switch sub-chassis 2310 (one cable from each switch line-card 2300-2310) are aggregated within multiple faceplate optical connectors 2368 (only one indicated) to interface to multiple external MPACs 2355. The faceplate MPAC optical connectors 2368 are disposed on the switch sub-chassis faceplate (not shown). A MPAC shuffle assembly 2325 provides optical fiber coupling among the switch faceplate MPAC optical connectors 2368 and the switch internal bulkhead MPAC optical connectors 2370 (only one indicated). The switch internal bulkhead MPAC optical connectors 2370 and 2371 may be disposed on the same physical internal bulkhead (not shown).

Figure 26:
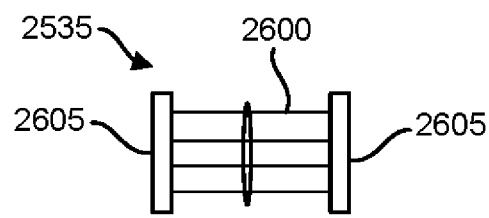
FIG. 26 schematically illustrates the external MPAC in the deployment shown in FIG. 25.
Figure 25:
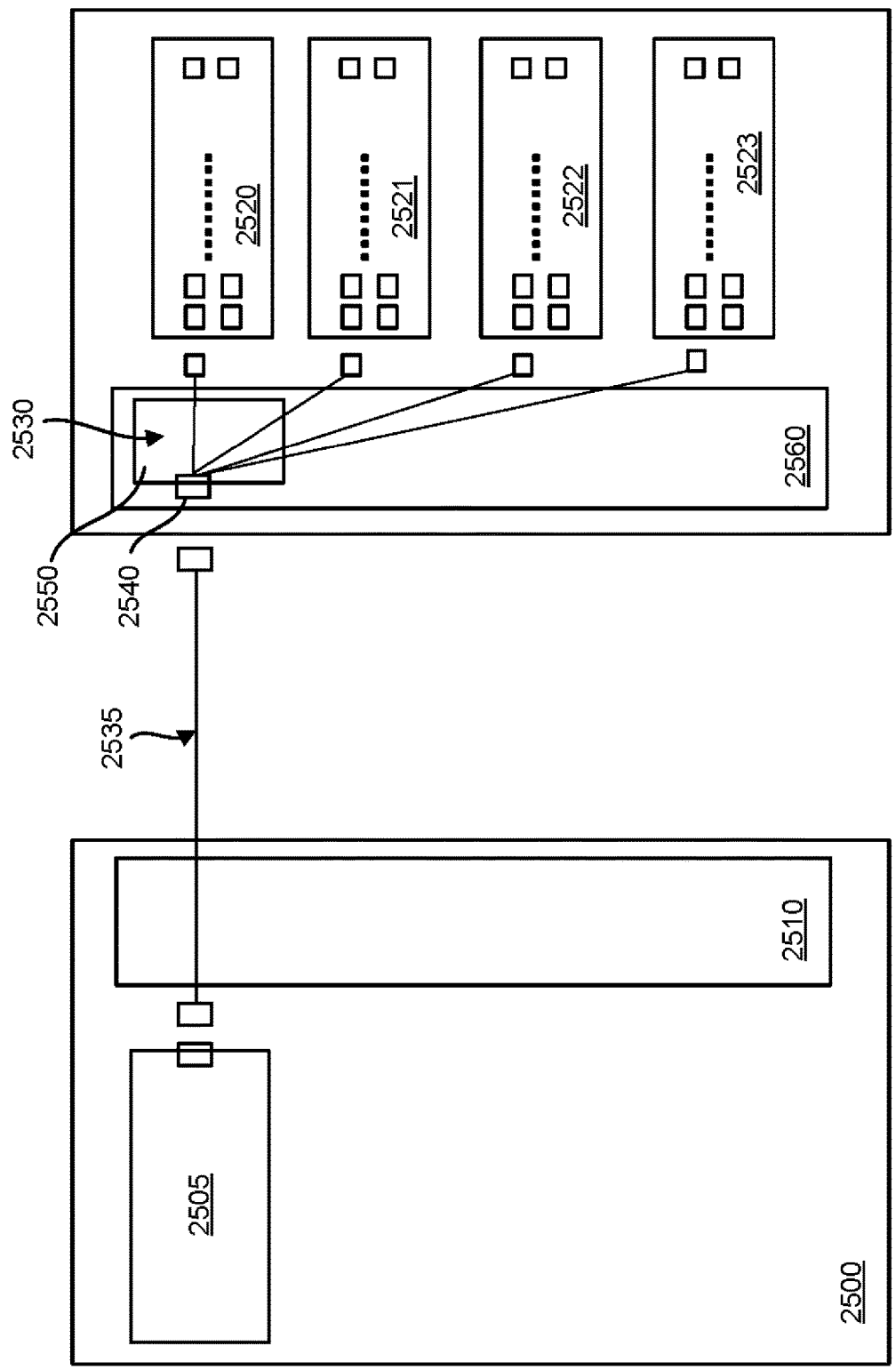
FIG. 25 schematically depicts an example deployment of the fourth use case in FIG. 23-FIG. 24.

FIG. 25 schematically depicts an example deployment of the fourth use case in FIG. 23 and FIG. 24. A first rack 2500 includes a server 2505 and a rack plenum 2510. A second rack 2515 encloses multiple switch boxes 2520-2523. An internal MPAC 2530 optically connects the switch boxes 2520-2523 to an external MPAC 2535 through a faceplate optical connector 2540 of an interconnect module 2550 in a rack plenum 2560. The external MPAC 2535 is shown in FIG. 26. The external MPAC 2535 includes four aggregated duplex optical fibers 2600 (only one indicated) and is terminated on either end by MPAC optical connectors 2605. The external MPAC 2535 and the switch faceplate optical connector 2540 each support four ports, one for each of the four switch boxes 2520-2523. The server 2505 is thus optically connected to multiple switch boxes 2520-2523 through a single external MPAC 2535.

Figure 27:
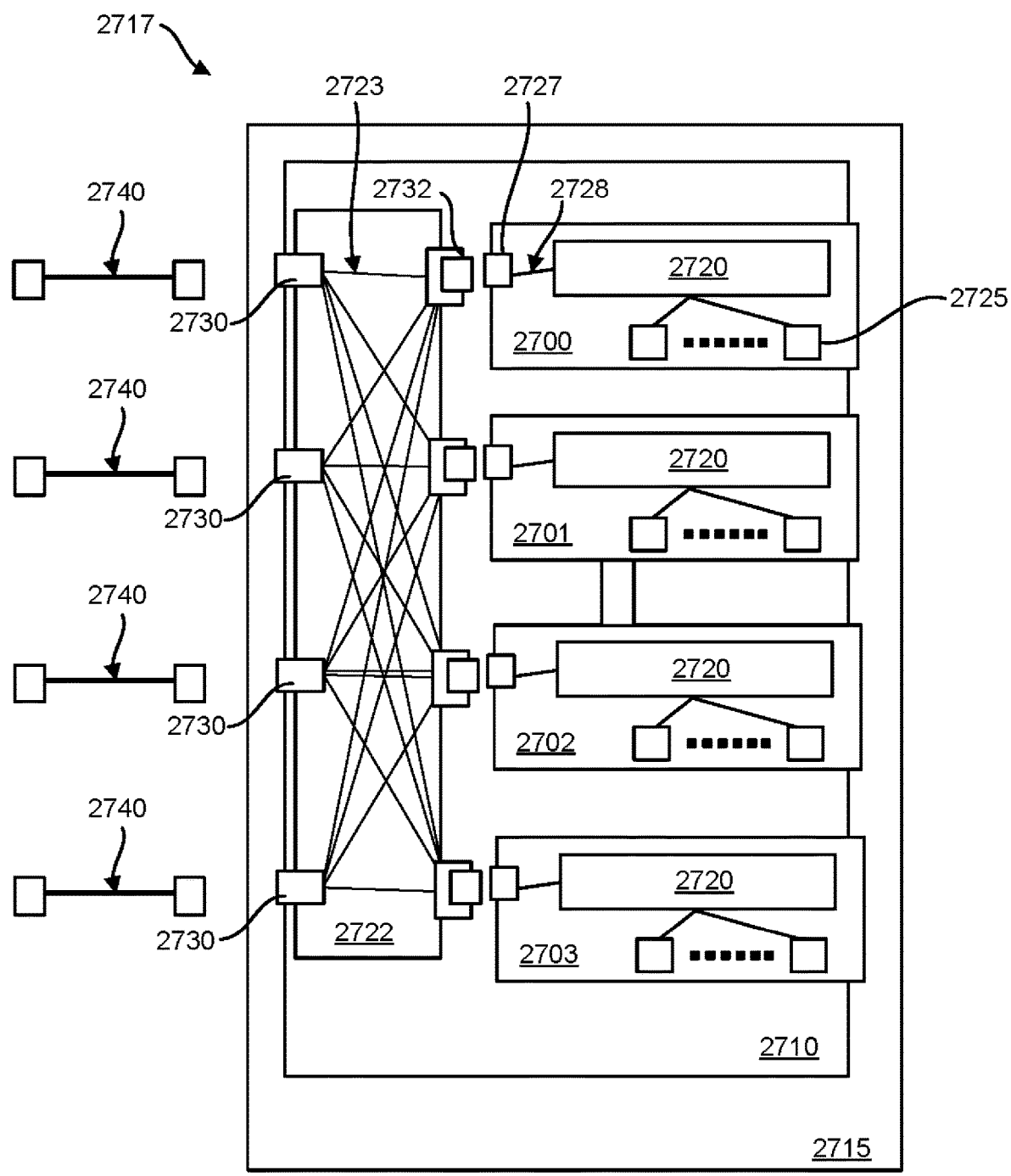
FIG. 27 schematically depicts a fifth use case for internal and external MPACs.

FIG. 27 schematically depicts a fifth use case for internal and external MPACs. Multiple fabric-attached memory nodes 2700-2703 are enclosed in a device chassis 2710 mounted in a rack 2715 of a computing system 2717. Each fabric-attached memory node 2700-2703 includes a bridge chip 2720 connected to a plurality of memory devices 2725 (only one indicated). The bridge chips 2720 have an integrated switch function as well as protocol conversion to specific memory technologies. Each bridge chip 2720 is optically connected to an internal MPAC 2728 (only one indicated). The internal MPAC 2728 also includes a module blind-mate optical connector 2727 (only one indicated) in a blind-mate housing (not shown) and a chip ferrule (not shown) by which multiple individual single-port aggregated duplex optical fibers (not separately shown) are connected to the bridge chip 2720.

The internal MPAC shuffle assembly 2723 provides a "many to many" connection. The internal MPAC shuffle assembly 2723 is disposed in a shuffle tray 2722 enclosed within the chassis 2710. The internal MPAC shuffle assembly 2723 includes a plurality of internal bulkhead optical connectors 2732 (only one indicated) and a plurality of faceplate optical connectors 2730. The faceplate is not shown. The internal bulkhead optical connectors 2732 blind-mate with the module blind-mate optical connectors 2727, and the faceplate optical connectors 2730 mate with the external MPACs 2740. Thus, the fabric-attached memory nodes 2700-2703 can be optically connected to external computing resources through the internal MPAC 2728, the internal MPAC shuffle assembly 2723, and the external MPACs 2740.

Figure 29:
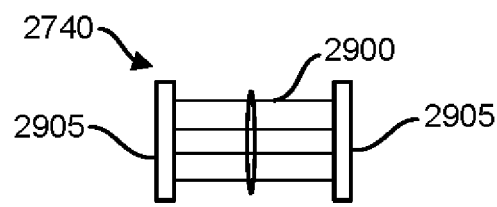
FIG. 29 schematically illustrates the external MPAC in the deployment shown in FIG. 28.
Figure 28:
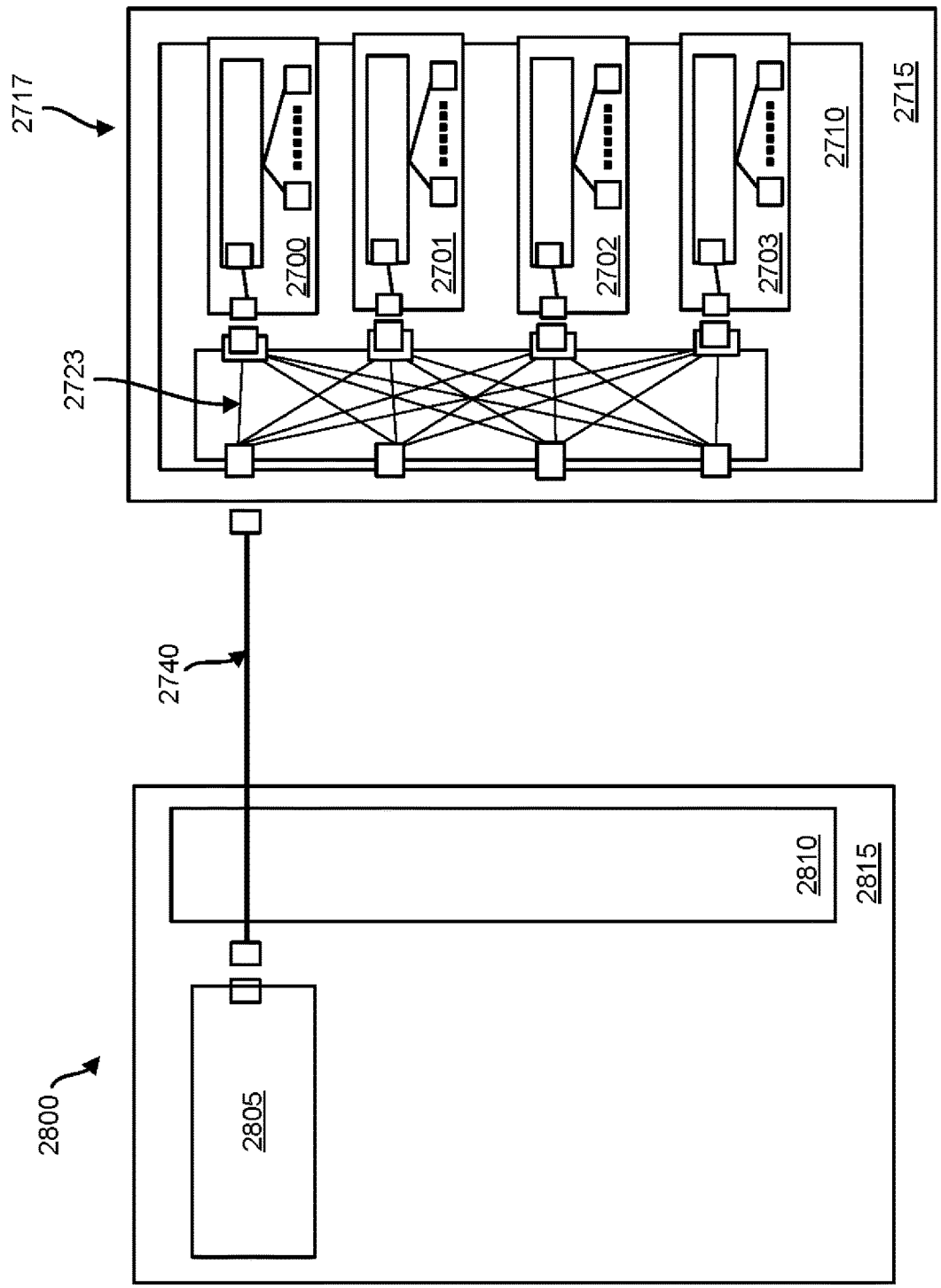
FIG. 28 schematically depicts an example deployment of the fifth use case in FIG. 27.

FIG. 28 schematically depicts the computing system 2717 of FIG. 27 optically connected through an external MPAC 2740 to a second computing system 2800. The computing system 2800 includes a compute node 2805 and a rack plenum 2810 housed in a rack 2815. The external MPAC 2740 is schematically illustrated in FIG. 29 and supports four lanes, one for each of the fabric-attached memory nodes 2700-2703. The external MPAC 2740 includes four aggregated duplex optical fibers 2900 (only one indicated) and is terminated on either end by MPAC optical connectors 2905. The external MPAC 2740 is connected directly to the server 2805. Thus, multiple fabric-attached memory nodes 2700-2703 can be optically connected to a server 2805 using a single external MPAC 2740.

Figure 30:
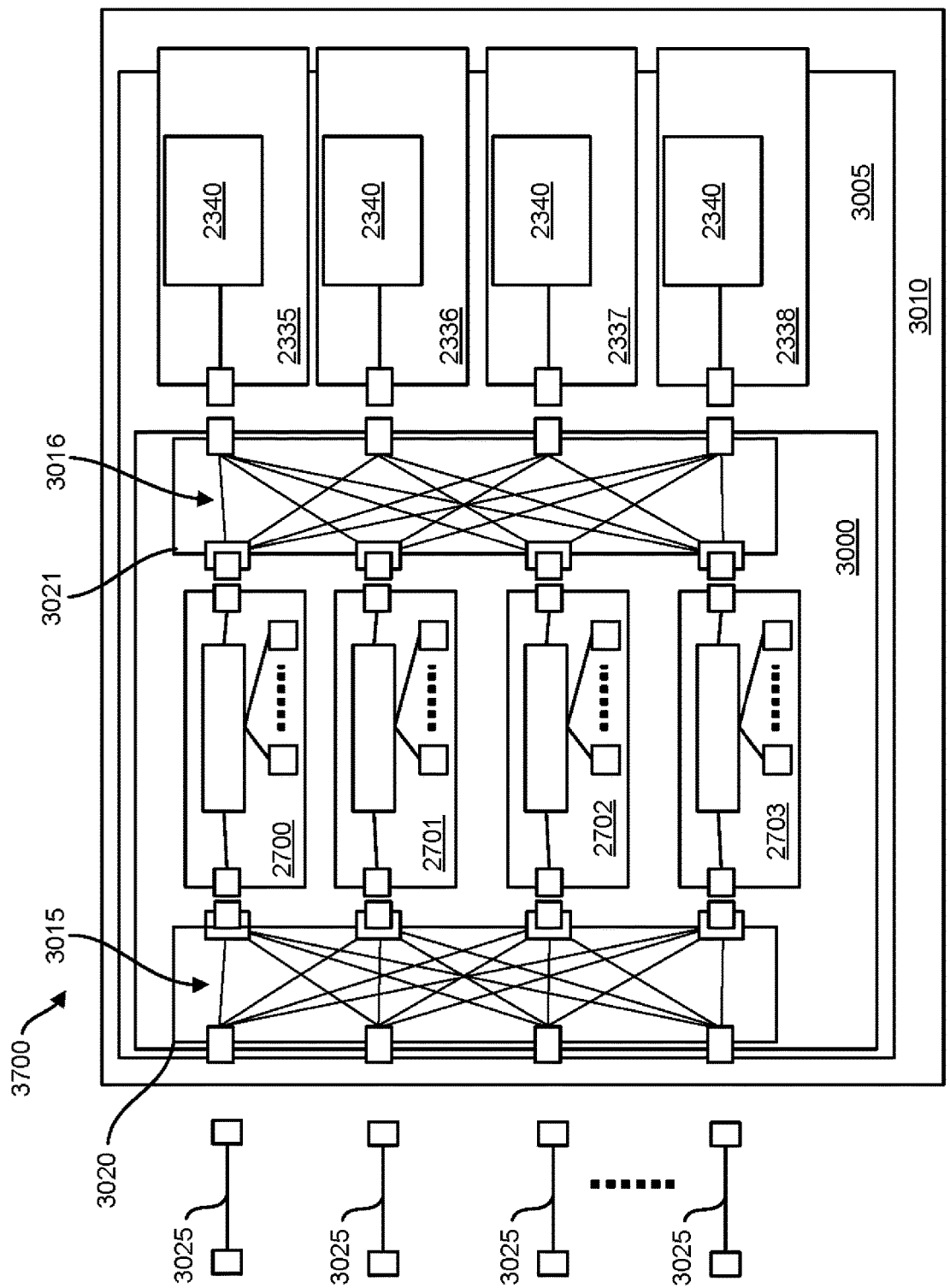
FIG. 30 schematically depicts a sixth use case for internal and external MPACs.

FIG. 30 schematically depicts a sixth use case for internal and external MPACs. A plurality of fabric-attached memory nodes 2700-2703 are housed in a device sub-chassis 3000 that is, in turn, mounted in a main chassis 3005 of a computing system 3700. A plurality of compute nodes 2335-2338 are also mounted in the main chassis 3005. The main chassis 3005 is then mounted in a rack 3010. Internal MPACs 3015, 3016 are disposed in respective shuffle trays 3020, 3021 that are also housed in the device sub-chassis 3000. Both the internal MPACs 3015 and 3016 are optical fiber shuffle assemblies providing "many to many" connections. The internal MPAC 3016 provides optical connectivity between the compute nodes 2335-2338 and the fabric-attached memory nodes 2700-2703 within the main chassis 3005. The internal MPAC 3015 provides optical connectivity between the fabric-attached memory nodes 2700-2703 and the external MPACs 3025.

Figure 32:
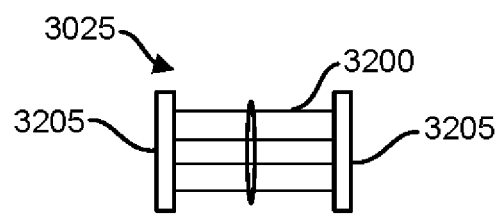
FIG. 32 schematically illustrates the external MPAC in the deployment shown in FIG. 31.
Figure 31:
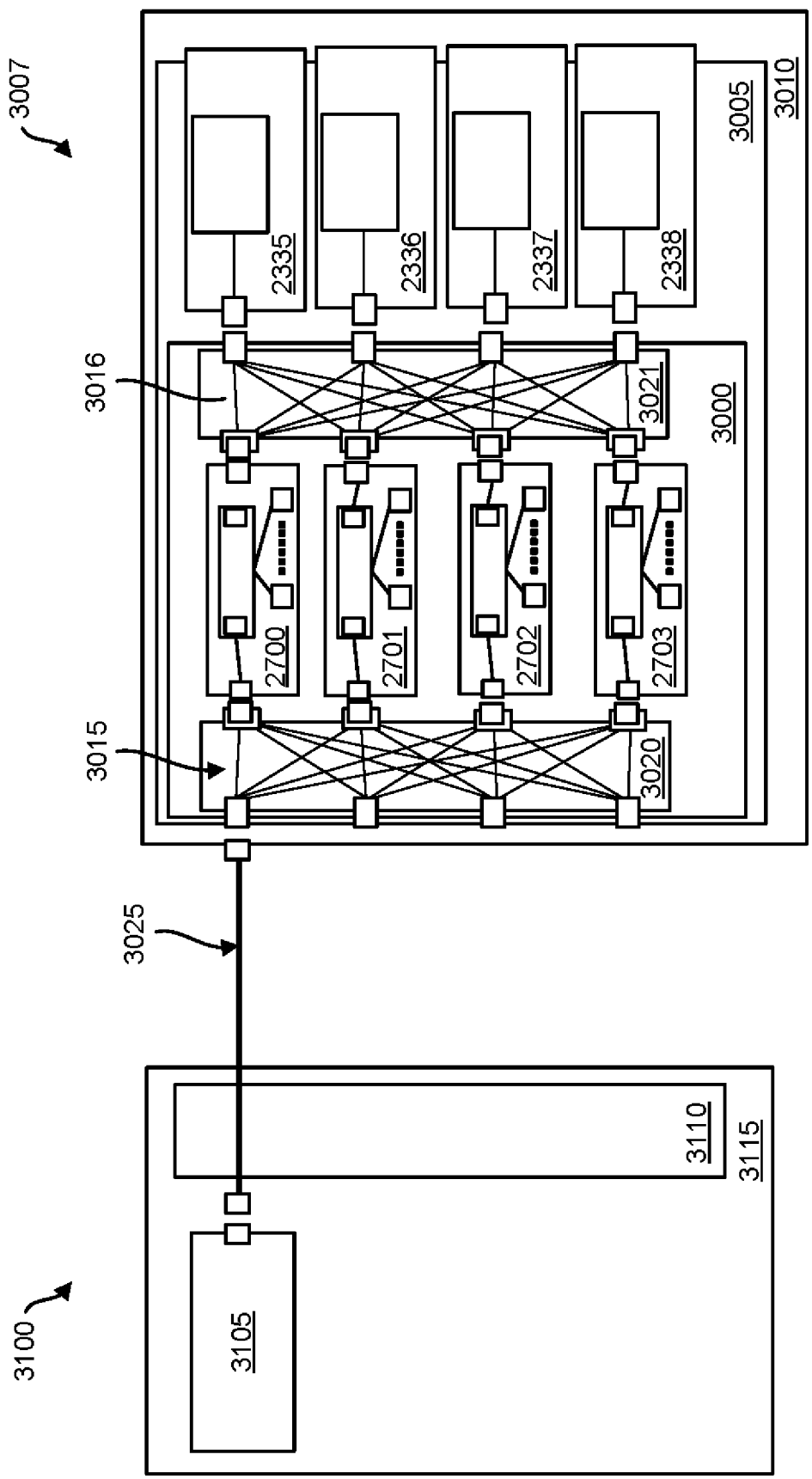
FIG. 31 schematically depicts an example deployment of the sixth use case in FIG. 30.

FIG. 31 schematically depicts an example deployment of the sixth use case in FIG. 30. The deployment includes the computing system 3007 of FIG. 30. A second computing system 3100 includes a compute node 3105 and a rack plenum 3110 mounted in a rack 3115. Note that the compute node 3105 is external to the computing system of FIG. 30. The fabric-attached memory nodes 2700-2703 are optically connected through the internal MPAC 3015 and the external MPAC 3025 to the external compute node 3105. The external MPAC 3025 is shown in FIG. 32, where it can be seen it supports four lanes, one for each of the fabric-attached memory nodes 2700-2703. The external MPAC 3025 includes four aggregated duplex optical fibers 3200 (only one indicated) and is terminated on either end by MPAC optical connectors 3205. The fabric-attached memory nodes 2700-2703 are optically connected to the external compute node 3105 using only the single external MPAC 3025.

Thus, in some examples, a multi-port aggregated cable includes a plurality of aggregated duplex optical fibers, a first optical interface, and a second optical interface. Each duplex optical fiber having a first end and a second end. The first optical interface is attached to each of the aggregated duplex optical fibers at the first end thereof and defines multiple ports, one for each of the duplex optical fibers. The first optical interface thereby aggregates the duplex optical fibers at the first end thereof in this manner. The second optical interface is attached to each of the aggregated duplex optical fibers at the second end thereof and also defines multiple ports, one for each of the duplex optical fibers. The second optical interface thereby aggregates the duplex optical fibers at the second end thereof.

In these examples, the first optical interface and/or the second optical interface includes an optical connector. This example may further include a plurality of optical connectors in the optical interface. The optical connector may be, for instance, blind-mate connector. In some of these examples, one of the first optical interface and the second optical interface may include a chip ferrule.

In some of these examples, each of the aggregated duplex optical fibers comprises a pair of optical fibers, wherein a first one of the paired optical fibers is a transmit fiber supporting multiple transmission wavelengths and a second one of the paired optical fibers is a receive fiber supporting multiple receive wavelengths. Alternatively, each of the aggregated duplex optical fibers is a single optical fiber that supports multiple transmit wavelengths and multiple receive wavelengths.

The multi-port aggregated cable may be, for instance an optical jumper or an optical fiber shuffle.

In other examples, a computing system may include a module and an enclosure disposed within the enclosure. The module may include a component having an optical interface and an internal multi-port aggregated cable optically connected to the component at a first end thereof and having a first optical interface at a second end thereof. The enclosure further includes a second optical interface optically connected to the first optical interface. The module may be removable. Where the module is removable, the removable module may be a switch line-card or a blade.

In some of these examples, the enclosure defines a midplane. In these examples, the enclosure further includes a system optical interface mounted to the midplane and blind-mated to first optical interface of the internal multi-port aggregated cable and the second optical interface is a faceplate optical interface. The enclosure may be a stand-alone chassis or a blade enclosure, or some other kind of enclosure known to the art.

In some of these example, the computing system further includes an interconnect module disposed within the enclosure that has an optical interface that is externally facing optical interface of the interconnect module.

In some of these examples the second optical interface is optically connected to the system optical interface through a second internal multi-port aggregated cable. The second internal multi-port aggregated cable may be an optical fiber shuffle or an optical jumper. Similarly, the first internal multi-port aggregated cable may be an optical jumper.

In some of these examples, the computing system may further include a second module. The second module may include a second component having an optical interface and a second internal multi-port aggregated cable. The second internal multi-port aggregated cable may be optically connected to the second component having an optical interface at a first end thereof and having a third optical interface at a second end thereof. In these examples, the third optical interface is optically connected to the second optical interface.

In still other examples, a fabric includes a first computing system, a second computing system, and an external multi-port aggregated cable. The first computing system includes a first plurality of optical modules, a first internal multi-port aggregated cable; and a first externally facing optical interface. The first externally facing optical interface may be optically connected to each of the first plurality of optical modules through the first internal multi-port aggregated cable. The second computing system may include a second plurality of optical modules, a second internal multi-port aggregated cable, and a second externally facing optical interface. The second externally facing optical interface may be optically connected to each of the second plurality of optical modules through the second internal multi-port aggregated cable. The external multi-port aggregated cable optically connects the first externally facing optical interface and the second externally facing optical interface such that the first plurality of optical modules is optically connected to the second plurality of optical modules.

In some of these examples, each of the first plurality of optical modules is optically connected to each of the second plurality of optical modules through the external multi-port aggregated cable. At least one of the first externally facing optical interface and the second externally facing optical interface may include a plurality of faceplate optical connectors. Alternatively, at least one of the first computing system and the second computing system may further comprise an interconnect module optically connected to at least one of the first plurality of optical modules and the second plurality of optical modules. In these examples, the second externally facing optical interface is an externally facing optical interface of the interconnect module.

Throughout the disclosure herein, various examples have been described as having certain numbers of features such as ports, lanes, line-cards, blades, switches, cables, ferrules, optical connectors, MPACs, modules, racks, enclosures, chassis, computing systems, etc. In the illustrated examples, sometimes less than all of these features may be shown as is noted above but the examples still contain a certain number of such features. The numbers of such features are illustrative only and are not limiting of the subject matter claimed below. Those ordinarily skilled in the art having the benefit of this disclosure will be able to readily appreciate other examples employing different numbers of one or more features and these examples will be within the scope of the claims set forth below.

This concludes the detailed description. The particular examples disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular examples disclosed above may be altered or modified and all such variations are considered within the scope and spirit of the appended claims. Accordingly, the protection sought herein is as set forth in the claims below.

What is claimed:

1. A multi-port aggregated cable, comprising:
   a plurality of duplex optical fibers, each duplex optical fiber having a first end and a second end;
   a first optical interface attached to each of the duplex optical fibers at the first end thereof and defining multiple ports, one for each of the duplex optical fibers, the first optical interface aggregating the duplex optical fibers at the first end thereof; and
   a second optical interface attached to each of the duplex optical fibers at the second end thereof and defining multiple ports, one for each of the duplex optical fibers, the second optical interface aggregating the duplex optical fibers at the second end thereof, at least one of the first and second optical interfaces establishing a one-to-many connection between the multi-port aggregated cable and one or more optical components co-packaged with at least one of a switch chip and a bridge chip, wherein at least one of the first and second optical interfaces is disposed in an optical connector and includes an optical zig-zag block constructed of a light turn focusing lens array, a plurality of mirror arrays, and a two-dimensional wavelength filter array, the optical zig-zag block adapted to multiplex and demultiplex, respectively, transmit and receive wavelengths in transmit and receive signals carried within the plurality of duplex optical fibers within the at least one of the first and second optical interfaces instead of within the one or more optical components.

2. The multi-port aggregated cable of claim 1, wherein one of the first optical interface and the second optical interface includes a chip ferrule comprising the optical zig-zag block.

3. The multi-port aggregated cable of claim 1, wherein each of the duplex optical fibers comprises a pair of optical fibers, wherein a first one of the paired optical fibers is a transmit fiber supporting multiple transmit wavelengths and a second one of the paired optical fibers is a receive fiber supporting multiple receive wavelengths.

4. The multi-port aggregated cable of claim 1, wherein each of the duplex optical fibers is a single optical fiber that supports multiple transmit wavelengths and multiple receive wavelengths.

5. The multi-port aggregated cable of claim 1, wherein the multi-port aggregated cable is an optical jumper.

6. A computing system, comprising:
   a module including:
      a component having a first optical interface; and
      an internal multi-port aggregated cable optically connected to the first optical interface of the component through a second optical interface disposed at a first end of the internal multi-port aggregated cable and having a third optical interface at a second end of the internal multi-port aggregated cable; and
   an enclosure in which the module is disposed, the enclosure including:
      a fourth optical interface optically connected to the third optical interface, at least one of the third and fourth optical interfaces effectuating a one-to-many connection with the internal multi-port aggregated cable, wherein at least one of the second and third optical interfaces is disposed in an optical connector and includes a light-turn focusing lens array, a plurality of mirror arrays, and a two-dimensional wavelength filer array, and wherein the light-turn focusing lens array, the plurality of mirror arrays, and the two-dimensional wavelength filter array operate together to multiplex and demultiplex, respectively, transmit and receive wavelengths in transmit and receive signals carried within the internal multi-port aggregated cable within the at least one of the second and third optical interfaces instead of within the first and fourth optical interfaces.

7. The computing system of claim 6, wherein the module is removable.

8. The computing system of claim 7, wherein the removable module is a switch line-card or a blade.

9. The computing system of claim 6, wherein the enclosure defines a midplane and the module is electronically coupled through the midplane.

10. The computing system of claim 6, further comprising:
    an interconnect module disposed within the enclosure and including an interconnect optical interface optically connected to the second optical interface; and
    wherein:
       the third optical interface is an externally facing optical interface of the interconnected module.

11. The computing system of claim 6, wherein the enclosure is a stand-alone chassis or a blade enclosure.

12. The computing system of claim 6, wherein the third optical interface is optically connected to the system optical interface through a second internal multi-port aggregated cable.

13. The computing system of claim 6, further comprising:
    a second module including:
       a second component having a fifth optical interface; and
       a second internal multi-port aggregated cable optically connected to the fifth optical interface of the second component at a first end thereof and having a sixth optical interface at a second end thereof; and
    wherein:
       the sixth optical interface is optically connected to the fourth optical interface.

14. A fabric comprising:
    a first computing system including:
       a first plurality of optical modules;
       a first internal multi-port aggregated cable; and
       a first externally facing optical interface optically connected to each of the first plurality of optical modules through the first internal multi-port aggregated cable;
    a second computing system including:
       a second plurality of optical modules;
       a second internal multi-port aggregated cable; and
       a second externally facing optical interface optically connected to each of the second plurality of optical modules through the second internal multi-port aggregated cable; and an external multi-port aggregated cable optically connecting the first externally facing optical interface and the second externally facing optical interface such that the first plurality of optical modules is optically connected to the second plurality of optical modules, wherein at least one of the first internal multi-port aggregated cable, the second internal multi-port aggregated cable, and the external multi-port aggregated cable comprise a one-to-many connected fiber assembly, wherein at least one of the first and the second internal multi-port aggregated cables includes an optical interface disposed on a first end or a second end in an optical connector, the optical interface comprising an optical zig-zag block constructed of a light turn focusing lens array, a plurality of mirror arrays, and a two-dimensional wavelength filter array, the optical zig-zag block adapted to multiplex and demultiplex, respectively, transmit and receive wavelengths in transmit and receive signals carried within at least one of the first internal multi-port aggregated cable, the second multi-port aggregated cable, and the external multi-port cable within the optical interface of the at least one of the first and the second internal multi-port aggregated cables instead of within one or more optical components of at least one of the first plurality of modules and the second plurality of modules.

15. The fabric of claim 14, wherein each of the first plurality of optical modules is optically connected to each of the second plurality of optical modules through the external multi-port aggregated cable.

16. The fabric of claim 14, wherein at least one of the first externally facing optical interface and the second externally facing optical interface includes a plurality of faceplate optical connectors.

17. The fabric of claim 14, wherein at least one of the first computing system and the second computing system further comprises:

an interconnect module optically connected to at least one of the first plurality of optical modules and the second plurality of optical modules; and wherein:

the second externally facing optical interface is an externally facing optical interface of the interconnect module.

18. The fabric of claim 14, wherein at least one of the first plurality of optical modules and the second plurality of modules is a removable optical module.

* * * * *